United States Patent
Srivastava et al.

(10) Patent No.: US 12,019,577 B2
(45) Date of Patent: Jun. 25, 2024

(54) LATENCY REDUCTION FOR LINK SPEED SWITCHING IN MULTIPLE LANE DATA LINKS

(71) Applicant: QUALCOMM Incorporated, San Diego, CA (US)

(72) Inventors: Prakhar Srivastava, Lucknow (IN); Santhosh Reddy Akavaram, Hyderabad (IN); Ravindranath Doddi, Hyderabad (IN); Ravi Kumar Sepuri, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 17/960,050

(22) Filed: Oct. 4, 2022

(65) Prior Publication Data
US 2024/0111700 A1    Apr. 4, 2024

(51) Int. Cl.
*G06F 13/42* (2006.01)
*G06F 13/40* (2006.01)

(52) U.S. Cl.
CPC ...... *G06F 13/4031* (2013.01); *G06F 13/4221* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 7,136,953 | B1* | 11/2006 | Bisson | G06F 13/4018 710/29 |
| 7,426,597 | B1* | 9/2008 | Tsu | G06F 13/4018 710/29 |
| 10,521,391 | B1* | 12/2019 | Savoj | G06F 13/4221 |
| 2014/0108697 | A1 | 4/2014 | Wagh | |
| 2019/0196991 | A1* | 6/2019 | Das Sharma | G06F 13/4018 |
| 2020/0278733 | A1* | 9/2020 | Li | G06F 1/28 |
| 2020/0351144 | A1* | 11/2020 | Farhoodfar | H04L 65/40 |
| 2020/0371579 | A1 | 11/2020 | Selvam et al. | |
| 2021/0041929 | A1 | 2/2021 | Connor et al. | |

OTHER PUBLICATIONS

International Search Report and Written Opinion—PCT/US2023/071273—ISA/EPO—Oct. 25, 2023.

\* cited by examiner

*Primary Examiner* — Michael Sun
(74) *Attorney, Agent, or Firm* — Loza & Loza, LLP/Qualcomm

(57) ABSTRACT

Aspects relate to link speed for a peripheral component interconnect. In one aspect, an apparatus includes an interface circuit configured to provide an interface with a multiple lane data link, the data link having a first set of lanes in an active state and a second set of lanes in an idle state and a controller. The controller is configured to receive a request at the controller to change a data rate of the data link to a requested data rate, change the second set of lanes from an idle state to an active state, train the second set of lanes to the requested data rate, transfer data traffic from the first set of lanes to the second set of lanes after the training, and transmit the data traffic on the second set of lanes.

20 Claims, 10 Drawing Sheets

LATENCY REDUCTION FOR LINK SPEED SWITCHING IN MULTIPLE LANE DATA LINKS

TECHNICAL FIELD

Aspects of the present disclosure relate generally to multiple lane data links and, more particularly, to reducing latency during link speed switching.

BACKGROUND

High-speed interfaces are frequently used between circuits and components of mobile wireless devices and other complex systems. For example, certain devices may include processing, communications, storage and/or display devices that interact with one another through one or more high-speed interfaces. Some of these devices, including synchronous dynamic random-access memory (SDRAM), may be capable of providing or consuming data and control information at processor clock rates. Other devices, e.g., display controllers, may use variable amounts of data at relatively low video refresh rates.

The peripheral component interconnect express (PCIe) interface is a popular high-speed interface which supports a high-speed link capable of transmitting data at multiple gigabits per second. The interface also supports multiple speeds and multiple numbers of lanes. PCIe provides lower latency and higher data transfer rates compared to parallel buses. PCIe is specified for communication between a wide range of different devices. Typically, one device, e.g., a processor or hub, acts as a host, that communicates with multiple devices, referred to as endpoints, through PCIe links. The peripheral devices or components may include graphics adapter cards, network interface cards (NICs), storage accelerator devices, mass storage devices, Input/Output interfaces, and other high-performance peripherals.

BRIEF SUMMARY

The following presents a summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

In one example an apparatus having an interface circuit and a controller is disclosed for a peripheral component interconnect express (PCIe) link. The apparatus includes an interface circuit configured to provide an interface with a peripheral component interconnect express (PCIe) link and a controller. The controller is configured to receive a request at the controller to change a data rate of the data link to a requested data rate, change the second set of lanes from an idle state to an active state, train the second set of lanes to the requested data rate, transfer data traffic from the first set of lanes to the second set of lanes after the training, and transmit the data traffic on the second set of lanes.

In another example a method includes receiving a request at a controller for a multiple lane data link to change a data rate of the data link to a requested data rate, the data link having a first set of lanes in an active state and a second set of lanes in an idle state. The second set of lanes is changed from an idle state to an active state. The second set of lanes is trained to the requested data rate. The data traffic is transferred from the first set of lanes to the second set of lanes after the training, and the data traffic is transmitted on the second set of lanes.

In another example a non-transitory computer-readable medium has instructions stored therein for causing a processor of an interconnect link to perform the operations of the method above.

In another example an apparatus includes means for providing an interface with a multiple lane data link, and means for receiving a request to change a data rate of the data link to a requested data rate, the data link having a first set of lanes in an active state and a second set of lanes in an idle state. The apparatus further includes means for changing the second set of lanes to an active state, means for training the second set of lanes to the requested data rate, means for transferring data traffic from the first set of lanes to the second set of lanes after the training, and means for transmitting the data traffic on the second set of lanes To the accomplishment of the foregoing and related ends, the one or more implementations include the features hereinafter fully described and particularly pointed out in the claims. The following description and the annexed drawings set forth in detail certain illustrative aspects of the one or more implementations. These aspects are indicative, however, of but a few of the various ways in which the principles of various implementations may be employed and the described implementations are intended to include all such aspects and their equivalents.

DETAILED DESCRIPTION

Figure 1:
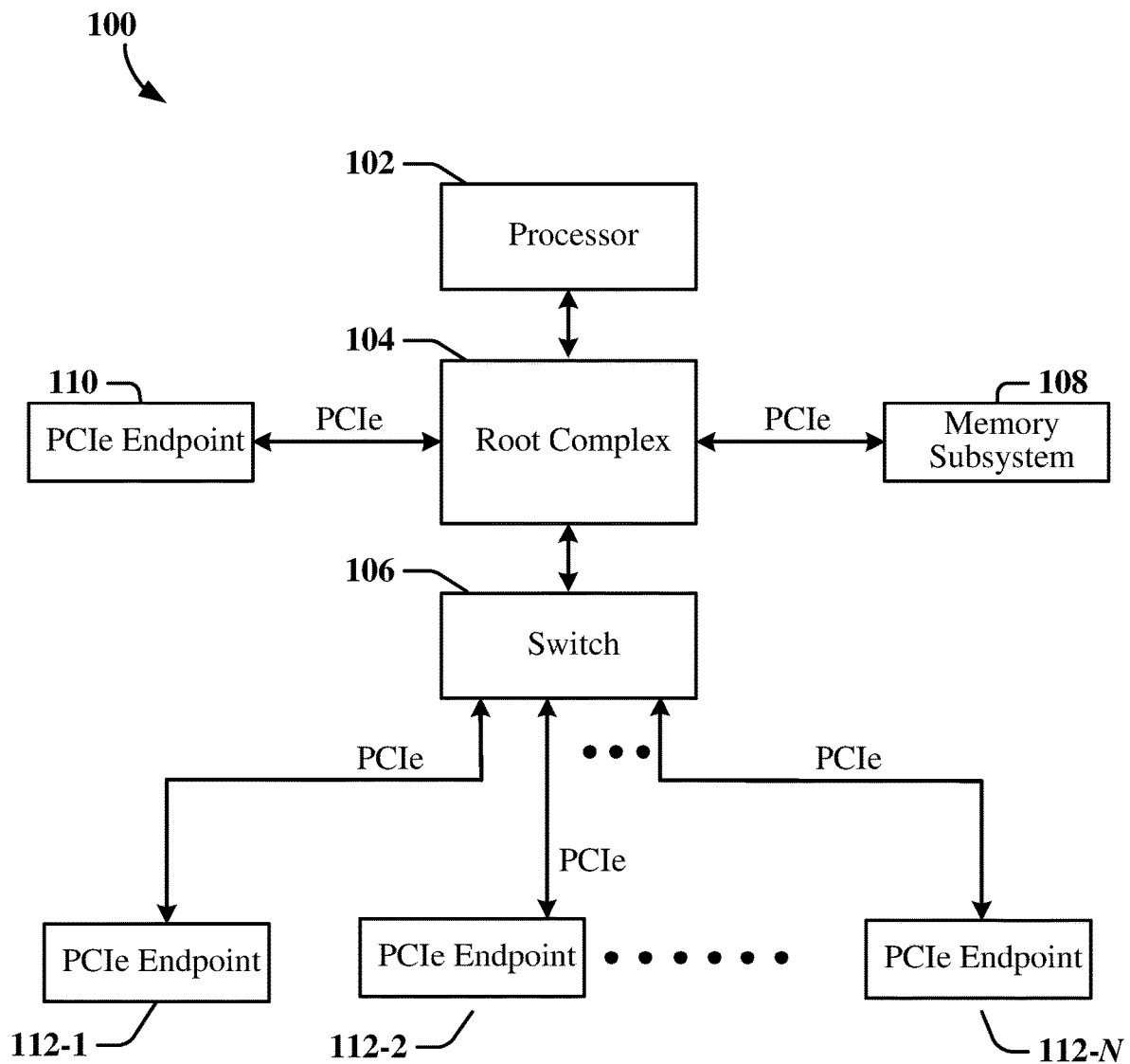
FIG. 1 is a block diagram of a computing architecture with PCIe interfaces suitable for aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, these concepts may be practiced without these specific details. In some instances, well-known structures and components are shown in block diagram form in order to avoid obscuring such concepts.

In a PCIe system, e.g., a root complex (RC) connected to an endpoint (EP) over a PCIe link, the bandwidth or data rate demands on the PCIe link change over time. To accommodate this, a dynamic GEN speed switch may be used. When a GEN speed switch is requested by either the RC or EP, the PCIe link is disabled from operation at the first speed and then performs training, recovery, and configuration at the new requested GEN speed. After this, the PCIe link is active again and ready to carry data at the new requested GEN speed. The process is the same for an increase or decrease in speed. During the training, recovery and configuration, no data is sent or received across the PCIe link. This stops communication between the RC and PC and also requires that data be buffered with a risk that some data may be lost.

As described herein, when idle lanes are available on a PCIe link, the idle lanes may perform training, recovery, and configuration at a newly requested GEN speed while the active lanes continue to operate at the current GEN speed. After the formerly active lanes are configured and active, then data traffic can be transferred to the newly active lanes at the newly requested GEN speed. This allows data communication to continue as before while the new GEN speed lanes are prepared. There is no need to interrupt the data traffic through the link.

A connection between any two PCIe devices, e.g., an RC and an EP, is referred to as a link A PCIe link is built around a duplex, serial (1-bit), differential, point-to-point connection referred to as a lane. With PCIe, data is transferred over two signal pairs: two lines (wires, circuit board traces, etc.) for transmitting and two lines for receiving. The transmitting and receiving pairs are separate differential pairs for a total of four data lines per lane. The link encompasses a set of lanes, and each lane is capable of sending and receiving data packets simultaneously between the host and the endpoint.

A PCIe link, as currently defined, is configured with a particular link width. The link width can scale from one to 32 separate lanes. The lanes are defined as powers of the number two. Usual deployments have 1, 2, 4, 8, 12, 16, or 32 lanes, which may be labeled as x1, x2, x4, x8, x12, x16, or x32, respectively, where the number is effectively the number of lanes. In an example, a PCIe x1 implementation has four lines to connect one wire-pair lane in each direction while a PCIe x16 implementation has 16 times that amount for 16 lanes or 64 lines.

A PCIe link may be configured to use less than all of its lanes in order to save power or for compatibility. As an example, an x4 PCIe add-on board may be installed into an x4, x8, x12, x16, or x32 slot or connector. After configuration and training, the link through the connector may be operated at widths of x1, x2, or x4 but not a larger width because the add-on card does not support more than 4 lanes. As currently defined, the link width may be up-sized to a larger width or down-sized to a smaller width during operation.

A PCIe link may also be configured for different link speeds, also referred to as a data rate, that depends on the stated speed capability of the link During configuration and training, a fastest PCIe link speed is determined which is normally the slowest maximum speed between the host and the endpoint. The PCIe link may be configured at that maximum common speed or a slower speed to change power. The link speed may be changed during operation. The link speed is referred to as the GEN speed because newer generations of PCIe standards provide for new higher speeds. For example, PCIe GEN1 allows for 2.5 giga transfers per second (GT/s), PCIe GEN2 allows for 5 GT/s, PCIe GEN3 allows for 8 GT/s, PCIe GEN4 allows for 16 GT/s, PCIe GEN5 allows for 32 GT/s, and later generations may offer still higher data rates for each lane of a link Higher speeds provide data transfer benefits but also consume more power and are more prone to errors. As a result, a PCIe link may be managed to operate at a lower GEN speed until there are high data rate demands on the link.

Power management and bandwidth negotiation may be performed at link initialization but may also be repeated at later times. During negotiation, each link partner, e.g., an RC and an EP, may advertise a supported number of lanes (e.g., link width) and a desired bandwidth at which to operate. For example, the link partners may agree to operate at the highest bandwidth supported by both partners. The link partners are negotiating that some number of lanes of the link be in an active state and may change the number of lanes to a lower rate for link stability reasons. In an example, the link width may be changed autonomously by hardware. As the number of lanes increases, the power to operate the link also increases. As such, an x16 link may be operated as an x1 link at lower power in some circumstances. This reduces the power consumed by the supporting hardware during low-activity periods.

FIG. 1 is a block diagram of an example computing architecture using PCIe interfaces. The computing architecture 100 operates using multiple high-speed PCIe interface serial links A PCIe interface may be characterized as an apparatus including a point-to-point topology, where separate serial links connect each device to a host, which is referred to as a root complex 104 (RC). In the computing architecture 100, the root complex 104 couples a processor 102 to memory devices, e.g., the memory subsystem 108, and a PCIe switch circuit 106. In some instances, the PCIe switch circuit 106 includes cascaded switch devices. One or more PCIe endpoint devices 110 (EP) may be coupled directly to the root complex 104, while other PCIe endpoint devices 112-1, 112-2 . . . 112-N may be coupled to the root complex 104 through the PCIe switch circuit 106. The root complex 104 may be coupled to the processor 102 using a proprietary local bus interface or a standards-defined local bus interface. The root complex 104 may control configuration and data transactions through the PCIe interfaces and may generate transaction requests for the processor 102. In some examples, the root complex 104 is implemented in the same Integrated Circuit (IC) device that includes the processor 102. The root complex 104 supports multiple PCIe ports.

The root complex 104 may control communication between the processor 102 and the memory subsystem 108 which is one example of an endpoint. The root complex 104 also controls communication between the processor 102 and other PCIe endpoint devices 110, 112-1, 112-2 . . . 112-N. The PCIe interface may support full-duplex communication between any two endpoints, with no inherent limitation on concurrent access across multiple endpoints. Data packets may carry information through any PCIe link. In a multi-lane PCIe link, packet data may be striped across multiple lanes. The number of lanes in the multi-lane link may be negotiated during device initialization and may be different for different endpoints.

When one or more lanes of the PCIe links are being underutilized by low bandwidth applications that could be adequately served by fewer lanes, then the root complex 104 and endpoint may operate the link with more or fewer lanes. In some examples, one or more lanes may be placed in one or more standby states in which some or all of the lanes are operated in a low power or a no power mode. Varying the number of active lanes for low bandwidth applications reduces the power to operate the link Supplying less power reduces current leakage, heat, and power consumption.

Figure 2:
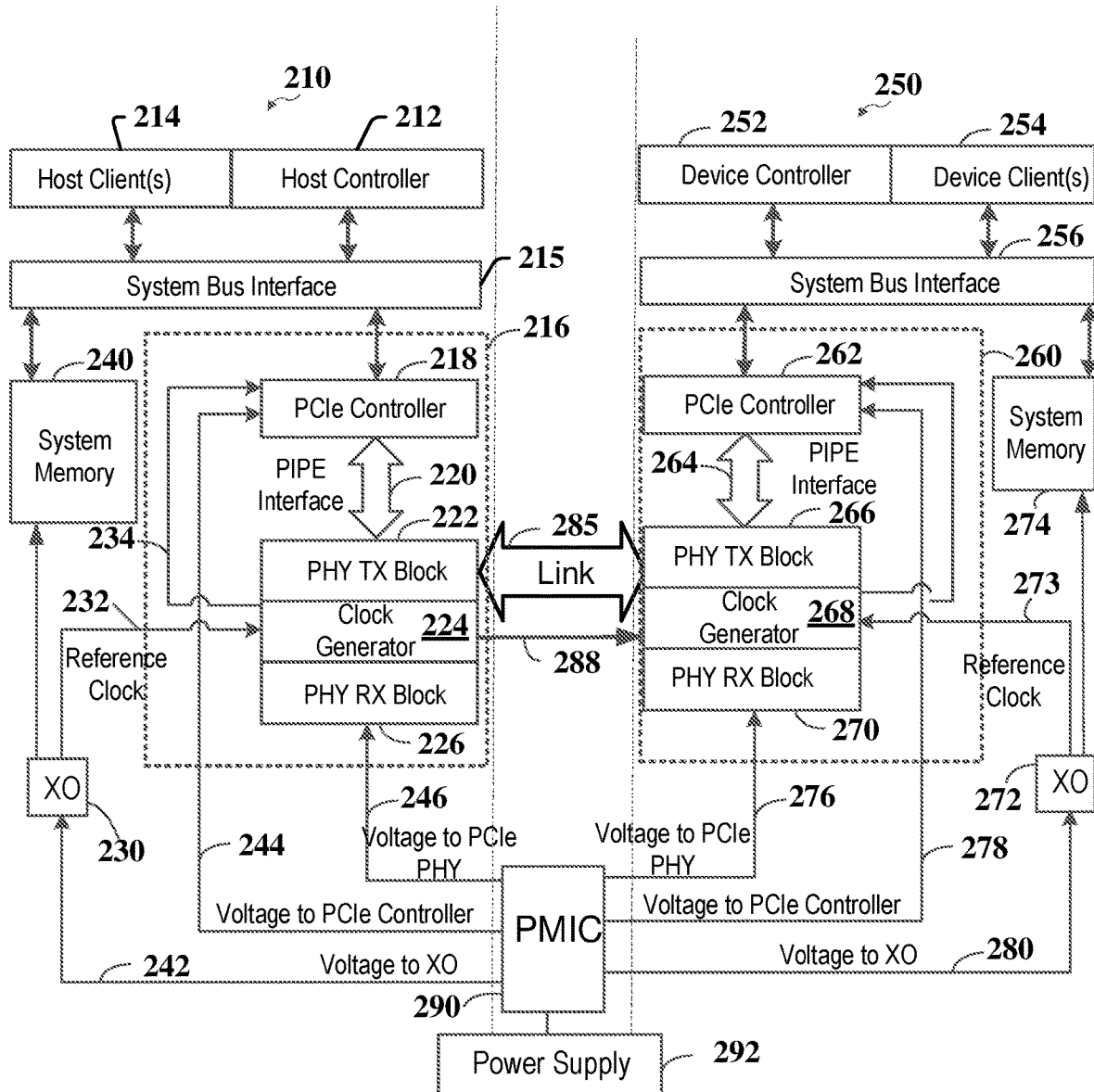
FIG. 2 is a block diagram of a system including a host system and an endpoint device system according to aspects of the present disclosure.

FIG. 2 is a block diagram of an exemplary PCIe system in which aspects of the present disclosure may be implemented. The system 205 includes a host system 210 and an endpoint device system 250. The host system 210 may be integrated on a first chip (e.g., system on a chip or SoC), and the endpoint device system 250 may be integrated on a second chip. Alternatively, the host system and/or endpoint device system may be integrated in first and second packages, e.g., SiP, first and second system boards with multiple chips, or in other hardware or any combination. In this example, the host system 210 and the endpoint device system 250 are coupled by a PCIe link 285.

The host system 210 includes one or more host clients 214. Each of the one or more host clients 214 may be implemented on a processor executing software that performs the functions of the host clients 214 discussed herein. For the example of more than one host client, the host clients may be implemented on the same processor or different processors. The host system 210 also includes a host controller 212, which may perform root complex functions. The host controller 212 may be implemented on a processor executing software that performs the functions of the host controller 212 discussed herein.

The host system 210 includes a PCIe interface circuit 216, a system bus interface 215, and a host system memory 240. The system bus interface 215 may interface the one or more host clients 214 with the host controller 212, and interface each of the one or more host clients 214 and the host controller 212 with the PCIe interface circuit 216 and the host system memory 240. The PCIe interface circuit 216 provides the host system 210 with an interface to the PCIe link 285. In this regard, the PCIe interface circuit 216 is configured to transmit data (e.g., from the host clients 214) to the endpoint device system 250 over the PCIe link 285 and receive data from the endpoint device system 250 via the PCIe link 285. The PCIe interface circuit 216 includes a PCIe controller 218, a physical interface for PCI Express (PIPE) interface 220, a physical (PHY) transmit (TX) block 222, a clock generator 224, and a PHY receive (RX) block 226. The PIPE interface 220 provides a parallel interface between the PCIe controller 218 and the PHY TX block 222 and the PHY RX block 226. The PCIe controller 218 (which may be implemented in hardware) may be configured to perform transaction layer, data link layer, and control flow functions specified in the PCIe specification, as discussed further below.

The host system 210 also includes an oscillator (e.g., crystal oscillator or "XO") 230 configured to generate a reference clock signal 232. The reference clock signal 232 may have a frequency of 19.2 MHz in one example, but is not limited to such frequency. The reference clock signal 232 is input to the clock generator 224 which generates multiple clock signals based on the reference clock signal 232. In this regard, the clock generator 224 may include a phase locked loop (PLL) or multiple PLLs, in which each PLL generates a respective one of the multiple clock signals by multiplying up the frequency of the reference clock signal 232.

The endpoint device system 250 includes one or more device clients 254. Each device client 254 may be implemented on a processor executing software that performs the functions of the device client 254 discussed herein. For the example of more than one device client 254, the device clients 254 may be implemented on the same processor or different processors. The endpoint device system 250 also includes a device controller 252. The device controller 252 may be configured to receive bandwidth request(s) from one or more device clients, and determine whether to change the number of active lanes or to change the GEN speed based on bandwidth requests. The device controller 252 may be implemented on a processor executing software that performs the functions of the device controller.

The endpoint device system 250 includes a PCIe interface circuit 260, a system bus interface 256, and endpoint system memory 274. The system bus interface 256 may interface the one or more device clients 254 with the device controller 252, and interface each of the one or more device clients 254 and device controllers 252 with the PCIe interface circuit 260 and the endpoint system memory 274. The PCIe interface circuit 260 provides the endpoint device system 250 with an interface to the PCIe link 285. In this regard, the PCIe interface circuit 260 is configured to transmit data (e.g., from the device client 254) to the host system 210 (also referred to as the host device) over the PCIe link 285 and receive data from the host system 210 via the PCIe link 285. The PCIe interface circuit 260 includes a PCIe controller 262, a PIPE interface 264, a PHY TX block 266, a PHY RX block 270, and a clock generator 268. The PIPE interface 264 provides a parallel interface between the PCIe controller 262 and the PHY TX block 266 and the PHY RX block 270. The PCIe controller 262 (which may be implemented in hardware) may be configured to perform transaction layer, data link layer and control flow functions.

The host system memory 240 and the endpoint system memory 274 at the endpoint may be configured to contain registers for the status of each lane of the PCIe link 285. These registers include group control registers and group status registers. In examples, the host system memory 240 and the endpoint system memory 274 both have a link GEN control register, a status register, and a capabilities register, among others.

The endpoint device system 250 also includes an oscillator (e.g., crystal oscillator) 272 configured to generate a stable reference clock signal 273 for the endpoint system memory 274. In the example in FIG. 2, the clock generator 224 at the host system 210 is configured to generate a stable reference clock signal 273, which is forwarded to the endpoint device system 250 via a differential clock line 288 by the PHY RX block 226. At the endpoint device system 250, the PHY RX block 270 receives the EP reference clock signal on the differential clock line 288, and forwards the EP reference clock signal to the clock generator 268. The EP reference clock signal may have a frequency of 100 MHz, but is not limited to such frequency. The clock generator 268 is configured to generate multiple clock signals based on the EP reference clock signal from the differential clock line 288, as discussed further below. In this regard, the clock generator 268 may include multiple PLLs, in which each PLL generates a respective one of the multiple clock signals by multiplying up the frequency of the EP reference clock signal.

The system 205 also includes a power management integrated circuit (PMIC) 290 coupled to a power supply 292 e.g., mains voltage, a battery or other power source. The PMIC 290 is configured to convert the voltage of the power supply 292 into multiple supply voltages (e.g., using switch regulators, linear regulators, or any combination thereof). In this example, the PMIC 290 generates voltages 242 for the oscillator 230, voltages 244 for the PCIe controller 218, and voltages 246 for the PHY TX block 222, the PHY RX block 226, and the clock generator 224. The voltages 242, 244 and 246 may be programmable, in which the PMIC 290 is configured to set the voltage levels (corners) of the voltages 242, 244 and 246 according to instructions (e.g., from the host controller 212).

The PMIC 290 also generates a voltage 280 for the oscillator 272, a voltage 278 for the PCIe controller 262, and a voltage 276 for the PHY TX block 266, the PHY RX block 270, and the clock generator 268. The voltages 280, 278 and 276 may be programmable, in which the PMIC 290 is configured to set the voltage levels (corners) of the voltages 280, 278 and 276 according to instructions (e.g., from the device controller 252). The PMIC 290 may be implemented on one or more chips. Although the PMIC 290 is shown as one PMIC in FIG. 2, it is to be appreciated that the PMIC 290 may be implemented by two or more PMICs. For example, the PMIC 290 may include a first PMIC for generating voltages 242, 244 and 246 and a second PMIC for generating voltages 280, 278 and 276. In this example, the first and second PMICs may both be coupled to the same power supply 292 or to different power supplies.

In operation, the PCIe interface circuit 216 on the host system 210 may transmit data from the one or more host clients 214 to the endpoint device system 250 via the PCIe link 285. The data from the one or more host clients 214 may be directed to the PCIe interface circuit 216 according to a PCIe map set up by the host controller 212 during initial configuration, sometimes referred to as Link Initialization, when the host controller negotiates bandwidth for the link. In examples, the host controller negotiates a first bandwidth for the transmit group of the link and negotiates a second bandwidth for the receive group of the link. At the PCIe interface circuit 216, the PCIe controller 218 may perform transaction layer and data link layer functions on the data e.g., packetizing the data, generating error correction codes to be transmitted with the data, etc.

The PCIe controller 218 outputs the processed data to the PHY TX block 222 via the PIPE interface 220. The processed data includes the data from the one or more host clients 214 as well as overhead data (e.g., packet header, error correction code, etc.). In one example, the clock generator 224 may generate a clock 234 for an appropriate data rate or transfer rate based on the reference clock signal 232, and input the clock 234 to the PCIe controller 218 to time operations of the PCIe controller 218. In this example, the PIPE interface 220 may include a 22-bit parallel bus that transfers 22-bits of data to the PHY TX block in parallel for each cycle of the clock 234. At 250 MHz this translates to a transfer rate of approximately 8 GT/s.

The PHY TX block 222 serializes the parallel data from the PCIe controller 218 and drives the PCIe link 285 with the serialized data. In this regard, the PHY TX block 222 may include one or more serializers and one or more drivers. The clock generator 224 may generate a high-frequency clock for the one or more serializers based on the reference clock signal 232.

At the endpoint device system 250, the PHY RX block 270 receives the serialized data via the PCIe link 285, and deserializes the received data into parallel data. In this regard, the PHY RX block 270 may include one or more receivers and one or more deserializers. The clock generator 268 may generate a high-frequency clock for the one or more deserializers based on the EP reference clock signal. The PHY RX block 270 transfers the deserialized data to the PCIe controller 262 via the PIPE interface 264. The PCIe controller 262 may recover the data from the one or more host clients 214 from the deserialized data and forward the recovered data to the one or more device clients 254.

On the endpoint device system 250, the PCIe interface circuit 260 may transmit data from the one or more device clients 254 to the host system memory 240 via the PCIe link 285. In this regard, the PCIe controller 262 at the PCIe interface circuit 260 may perform transaction layer and data link layer functions on the data e.g., packetizing the data, generating error correction codes to be transmitted with the data, etc. The PCIe controller 262 outputs the processed data to the PHY TX block 266 via the PIPE interface 264. The processed data includes the data from the one or more device clients 254 as well as overhead data (e.g., packet header, error correction code, etc.). In one example, the clock generator 268 may generates a clock based on the EP reference clock through a differential clock line 288, and inputs the clock to the PCIe controller 262 to time operations of the PCIe controller 262.

The PHY TX block 266 serializes the parallel data from the PCIe controller 262 and drives the PCIe link 285 with the serialized data. In this regard, the PHY TX block 266 may include one or more serializers and one or more drivers. The clock generator 268 may generate a high-frequency clock for the one or more serializers based on the EP reference clock signal.

At the host system 210, the PHY RX block 226 receives the serialized data via the PCIe link 285, and deserializes the received data into parallel data. In this regard, the PHY RX block 226 may include one or more receivers and one or more deserializers. The clock generator 224 may generate a high-frequency clock for the one or more deserializers based on the reference clock signal 232. The PHY RX block 226 transfers the deserialized data to the PCIe controller 218 via the PIPE interface 220. The PCIe controller 218 may recover the data from the one or more device clients 254 from the deserialized data and forward the recovered data to the one or more host clients 214.

Figure 3:
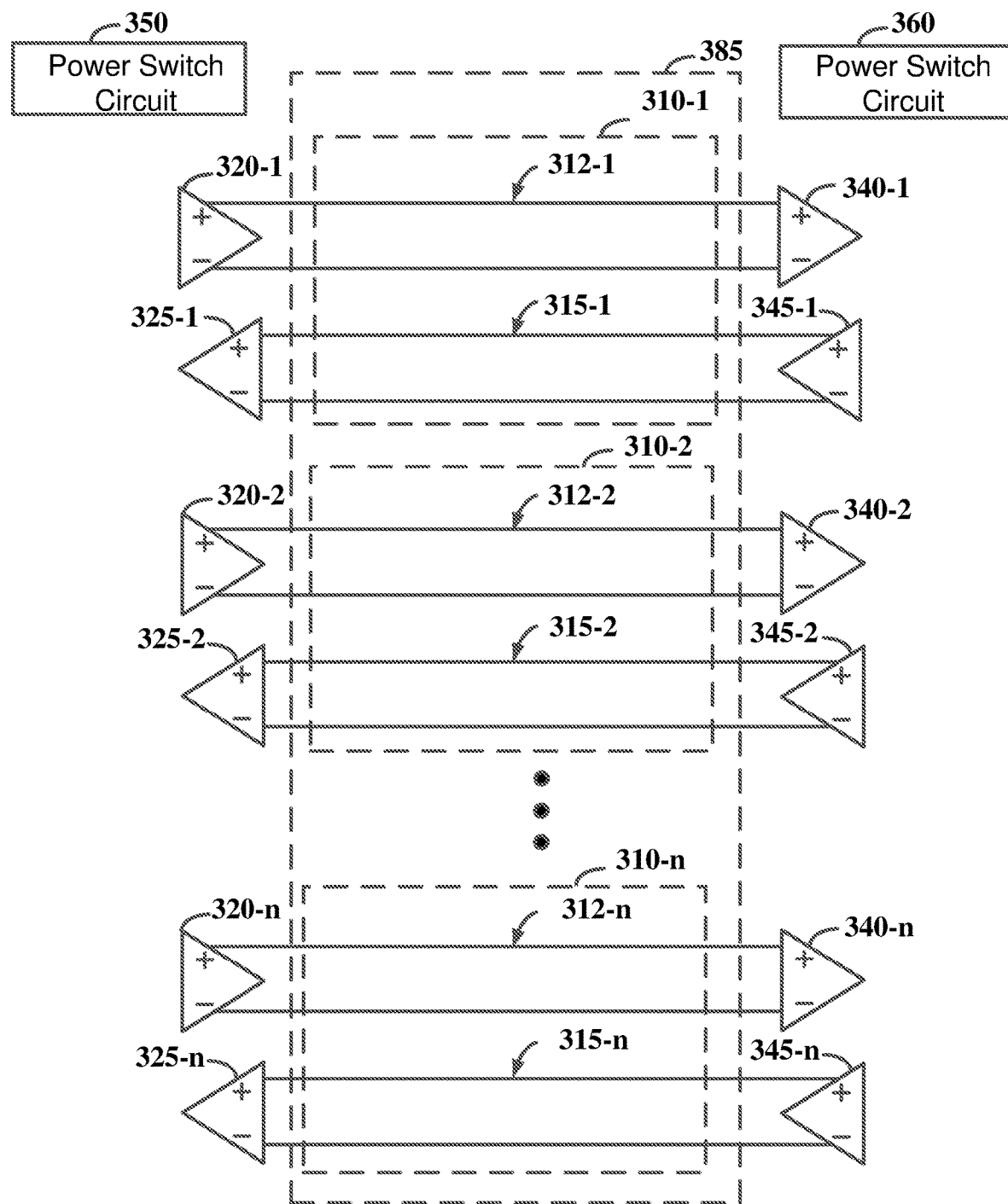
FIG. 3 is a diagram of lanes and corresponding drivers in a link according to aspects of the present disclosure.

FIG. 3 is a diagram of lanes in a link 385, e.g., the PCIe link 285, that may be used in the system of FIG. 1 and FIG. 2. In this example, the link 385 includes multiple lanes 310-1 to 310-n, in which each lane includes a respective first differential line pair 312-1 to 312-n for sending data from the host system 210 to the endpoint device system 250, and a respective second differential line pair 315-1 to 315-n for sending data from the endpoint device system to the host system 210. From the perspective of the host system, the first lane 310-1 is dual simplex, with a first differential line pair 312-1 as transmit lines and a second differential line pair 315-1 as receive lines. From the perspective of the endpoint device system, the first lane 310-1 has receive lines and transmit lines. The first differential line pairs 312-1 to 312-n and the second differential line pairs 315-1 to 315-n may be implemented with metal traces on a substrate (e.g., printed circuit board), in which the host system may be integrated on a first chip mounted on the substrate and the endpoint device is integrated on a second chip mounted on the substrate. Alternatively, the link may be implemented through an adapter card slot, a cable, or a combination of different media. The link may also include an optical portion in which the PCIe packets are encapsulated within a different system. In this example, when data is sent from the host system to the endpoint device system across multiple lanes, the PHY TX block 222 may include logic for partitioning the data among the lanes. Similarly, when data is sent from the endpoint device system to the host system 210 across multiple lanes, the PHY TX block 266 may include logic for partitioning the data among the lanes.

The PHY TX block 222 of the host system 210 shown in FIG. 2 may be implemented to include a transmit driver 320-1 to 320-n to drive each first differential line pair 312-1 to 312-n to transmit data and the PHY RX block 270 of the host shown in FIG. 2 may be implemented to include a receiver 340-1 to 340-n (e.g., amplifier) to drive each second differential line pair 312-1 to 312-n to receive data. Each transmit driver 320-1 to 320-n is configured to drive the respective differential line pair 312-1 to 312-n with data and each receiver 340-1 to 340-n is configured to receive data from the respective first differential line pair 312-1 to 312-n. Also, in FIG. 2, the PHY TX block 266 of the endpoint device system 250 may include a transmit driver 345-1 to 345-n for each second differential line pair 315-1 to 315-n and the PHY RX block 226 of the host system 210 may include a receiver 325-1 to 325-n (e.g., amplifier) for each second differential line pair 315-1 to 315-n. Each transmit driver 345-1 to 345-n is configured to drive the respective second differential line pair 315-1 to 315-n with data and each receiver 325-1 to 325-n is configured to receive data from the respective second differential line pair 315-1 to 315-n.

In certain aspects, the width of the link 385 is scalable to match the capabilities of the host system and the endpoint. The link may use one lane 310-1 for an x1 link, two lanes, 310-1, 310-2 for an x2 link or more lanes for wider links up to n lanes from 310-1 to 310-n. Currently links are defined for 1, 2, 4, 8, 16, and 32 lanes, although a different number of lanes may be used to suit particular implementations.

In one example, the host system 210 may include a power switch circuit 350 configured to individually control power to the transmit drivers 320-1 to 320-n and the receivers 325-1 to 325-n from the PMIC 290. Therefore, in this example, the number of drivers and receivers that are powered on scales with the width of the link 385. Similarly, the endpoint device system 250 as was shown in FIG. 2 may include a power switch circuit 360 configured to individually control power to the transmit drivers 345-1 to 345-n and the receivers 340-1 to 340-n from the PMIC 290. In this way the host system sets a number of the plurality of drivers to be selectively powered by the power switch circuit to change a number of active transmit lines or receive lines based on the number of lines that are powered. With differential signaling the lines will be set as active or standby in pairs.

Figure 4:
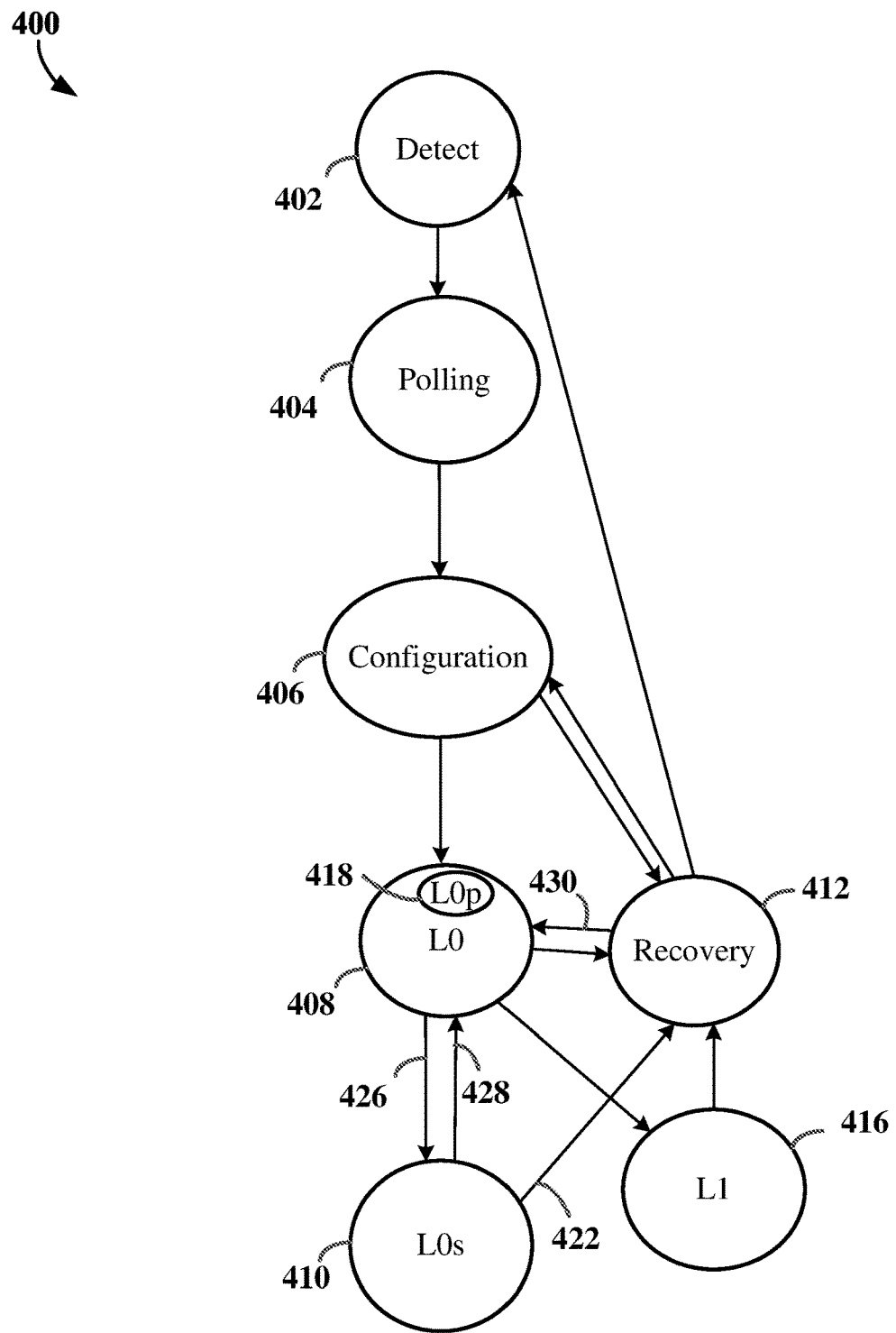
FIG. 4 is a state diagram illustrating the operation of a power management state machine according to aspects of the present disclosure.

FIG. 4 is a state diagram 400 illustrating the operation of a portion of a power management state machine in accordance with certain aspects disclosed herein. The Active State Power Management (ASPM) protocol is a state machine approach to reduce power based on link activity detected over the PCIe link between the root complex (RC) and an endpoint (EP) PCIe device. The state diagram is consistent with the Link Training and Status state machine (LTSSM) as defined for PCIe. However, other approaches may be used instead. In this approach, the link operates in an L0 state 408 (i.e., link operation state) when data is being transferred over the PCIe link There may be other operational states, e.g., an L0p sub-state 418, and L0s state 410, etc. The L0p sub-state 418 is not an inactive or idle state. When the L0p sub-state 418 is enabled, then the link can be configured in an L0p active state in which, based on data rate requirements, the link can be downsized by putting a few lanes of the lanes in electrical idle while still carrying data on other lanes that are in an active L0p sub-state. Similarly for upsizing requests electrical idle lanes can be independently retrained to the L0p active sub-state without disturbing ongoing data transfers on other active lanes in the link. The ASPM protocol may also support additional active and standby states and substrates, e.g., L1, L2, L1.1 and L1.2 etc. As shown, the L0s state 410 is only accessible through a connection through the L0 state 408. An ASPM state change may be initiated when conditions on a link dictate or suggest that a transition between states is desired or appropriate. Both communication partners on the link may initiate power state change requests when conditions are right.

The PCIe link initiates operation in a Detect state 402. In this state, the host controller of the RC and EP detect the active connection. The link then moves to a Polling state 404 during which the host controller of the RC polls for any active EP connections. Similarly, the EP host controllers poll the RC host controller. This allows the available link width and GEN speeds to be determined. The PCIe link then moves to a Configuration state 406 during which the RC and EP ports are configured for a particular link width and GEN speed. Some or all of the lanes are configured as active and any unused lanes are configured as idle, e.g., in an L0s state 410. The active lanes are in the L0 state 408.

When the link is idle (e.g., for a short time interval between data bursts), the link may be taken from the L0 state 408 to a standby state, e.g., the L0s state 410 which is accessible only through a connection to the L0 state 408. In this example, the L0s state 410 is a low power standby for the L0 state 408. An L1 state 416 is a standby state with a lower latency than the L0s state 410. The L0s state 410 serves as a standby state and also serves as an initialization state after a power-on, system reset, or after an error condition is detected. In the L0s state 410, device discovery and bus configuration processes may be implemented before the link transitions 428 to the L0 state 408. In the L0 state 408, PCIe devices may be active and responsive to PCIe transactions, and/or may request or initiate a PCIe transaction. The L1 state 416 is a primary standby state and allows for a quick return to the L0 state 408 through a Recovery state 412. The L0s state 410 is a lower power state that allows for an electrical idle state and a transition may be made through the Recovery state 412. The L0s state 410 may be entered through a transition 426 when a PCIe device determines that there are no outstanding PCIe requests or pending transactions. Power consumption may be reduced by disabling or idling the transceivers in the PCIe bus interfaces, disabling, gating clocks used by the PCI device, and disabling PLL circuits used to generate clocks used to receive data. A PCIe device may make the transition 426 to the L0s state 410 through the operation of a hardware controller or some combination of operating system and hardware control circuits.

When the PCIe link becomes active while a device, e.g., an RC or EP, is in an electrical idle state, e.g., the L0s state 410, a return to the L0 state 408 is initiated for the device. A direct transition to the L0 state 408 may not be available. The PCIe link may first transition 422 to a Recovery state 412 in which the transceivers in the PCIe bus interfaces, clocks used by the PCI device, and/or PLL circuits are enabled. When the transceivers and other circuits are determined to be functional, then a transition 430 from the Recovery state 412 to the L0 state 408 may be initiated.

The ASPM protocol also manages GEN speed changes for a PCIe link A PCIe link may be operated at a lower GEN speed to save power or a higher GEN speed to provide higher performance. To change the GEN speed, the ASPM protocol takes the active lane out of the L0 state 408 back to the Configuration state 406 to configure the link to the new GEN speed. After configuration, the PCIe link is taken back to the L0 state to operate in the newly configured GEN speed. In some aspects, when there are some lanes in the L0 state 408 and other lanes in the L0s state 410, the lanes in the L0 state 408 can continue to operate in the L0 state 408 while the other lanes are transitioned to the Configuration state 406. The lanes in the Configuration state 406 are configured to the new GEN speed and then transitioned to the L0 state 408 to operate in the new GEN speed. The lanes that were in the L0 state can be transitioned to an idle state e.g., the L0s state 410. These lanes can be reconfigured in the Configuration state 406 or may remain in the L0s state 410 for later use.

The ASPM protocol may also manage the link width to reduce or increase the link width, also referred to as up-sizing and down-sizing the link width. By reducing the link width during low throughput data traffic scenarios, subsystems of the PCIe link scale down voltage levels (e.g., to lower operating levels that satisfy current throughput over the PCIe link). The scaled down one or more voltage levels reduce power consumption (e.g., reduce leakage currents during sustained low throughput traffic or in idle use case). The number of lanes also affect power consumption. In effect, there is an L0, L0s, L1 transition state diagram for each lane.

Figure 5A:
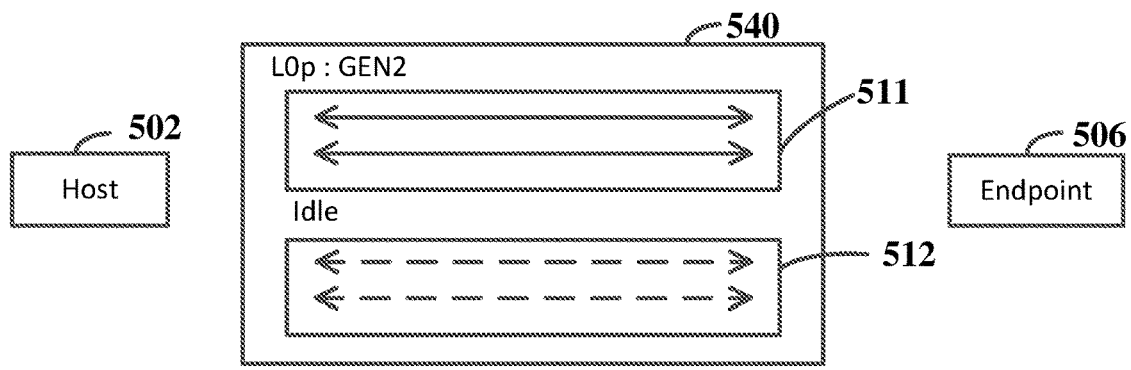
FIG. 5A is a diagram of a multiple lane data link according to aspects of the present disclosure.

FIG. 5A shows a multiple lane data link 540 e.g., a PCIe link of duplex traffic lanes between a host 502 and an EP 506. The lanes each include a line in each direction so that the data rate and configuration is the same in both directions. The duplex traffic lanes may have the same physical structure as in FIG. 3 but are generalized to show a transition from one data rate to another data rate. The data link 540 includes four lanes. The duplex traffic lanes are in the same structure and capability as in the example shown in FIG. 3. Each lane includes two transmit lines as a differential line pair and two receive lines as a differential line pair for four lines per lane and sixteen lines for the x4 link. The first set of lanes 511, lane 0 and lane 1, is in an active state, e.g., an L0 state, as an x2 link Data may be transmitted in one or both directions with a particular data rate or speed configuration, e.g., GEN2 speed. The second set of lanes 512, lane 2 and lane 3, is in an idle state, e.g., when L0p is enabled, and not transmitting any traffic. While four lanes are shown, there may be more or fewer lanes to suit particular implementations. As mentioned above, PCIe data links operate on a rule of 2 so that x1, x2, x4, x8, x16 and x32 are supported. The data link 540 is configured as an x4 data link but the link width is configured as x2 GEN2 to operate more efficiently for the data rate carried by the link.

Figure 5B:
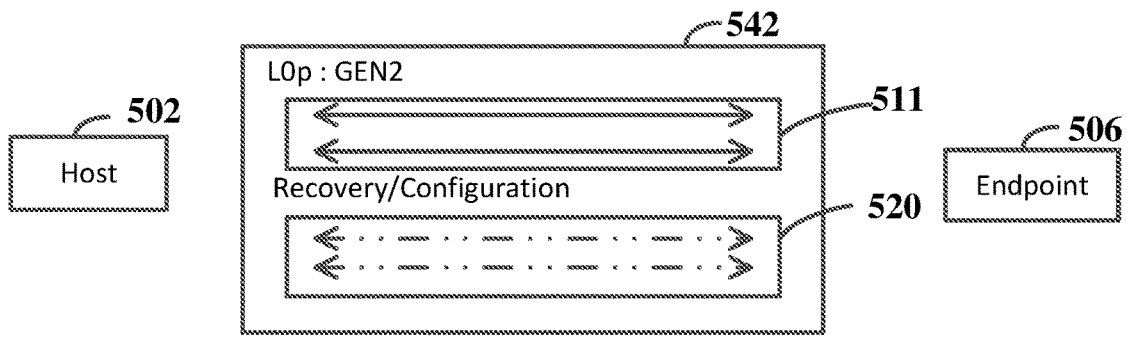
FIG. 5B is a diagram of a multiple lane data link with a second set of lanes in recovery and configuration according to aspects of the present disclosure.

FIG. 5B shows a multiple lane data link 542 between the host 502 and the EP 506 training to a new data rate. In one aspect, when a controller at the host 502 or EP 504 receives a request to change the data rate of the data link 542, e.g., from GEN2 to GEN3, the data link 542 is changed. The request may be generated by the host controller or the EP controller and is then sent to the corresponding controller at the opposite end, e.g., the EP controller or the host controller, respectively. The first set of lanes 511 continue to transmit data traffic as before. The second set of lanes 520, which was in an idle state, lane 2 and lane 3, change to an active state and then transition to the recovery state and then the configuration state. This changes the second set of lanes from the idle state to an active state and trains the second set of lanes to the requested data rate. The second set of lanes 520 is not in electrical idle as before, but no data is transmitted on the second set of lanes 520 during this time. While the second set of lanes 520 is undergoing recovery and configuration, the multiple lane data link 542 between the host 502 and the EP 504 continues to transmit data traffic at the original data rate on the original first set of lanes 511, lane 0 and lane 1.

Figure 5C:
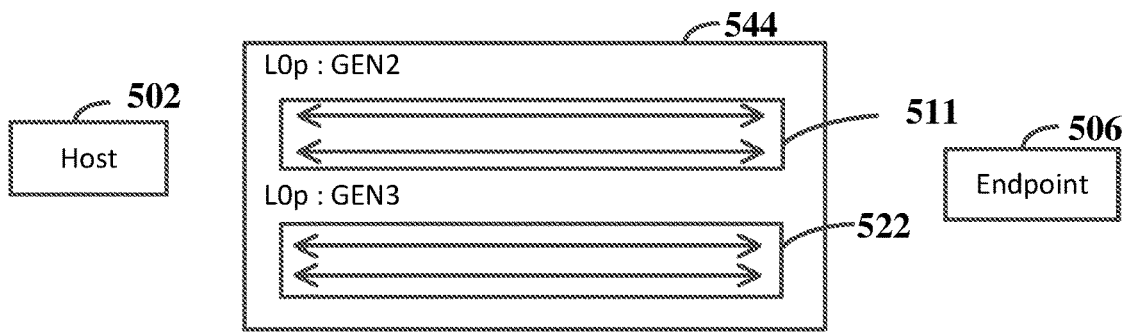
FIG. 5C is a diagram of a multiple lane data link after a configuration state speed change according to aspects of the present disclosure.

FIG. 5C shows a multiple lane data link 544 after the configuration state speed change of the second set of lanes 522. The first set of lanes 511 is still in the same active state, e.g., the L0 state and transmitting data in both directions at the original speed, e.g., GEN2 as in FIGS. 5A and 5B. The second set of lanes 522, lane 2 and lane 3 has been reconfigured into an active state at the new requested data rate, e.g., GEN3, speed. Traffic is still being carried on the first set of lanes 511 at the original speed. To transition data traffic of the data link 544 to the new speed, the data traffic is transferred from the first set of lanes 512 to the second set of lanes 522 after the training in FIG. 5B. The particular data rates, GEN2 and GEN3 are provided as examples. A similar process is performed for any data rate change and also to up-size or down-size the link width.

Figure 5D:
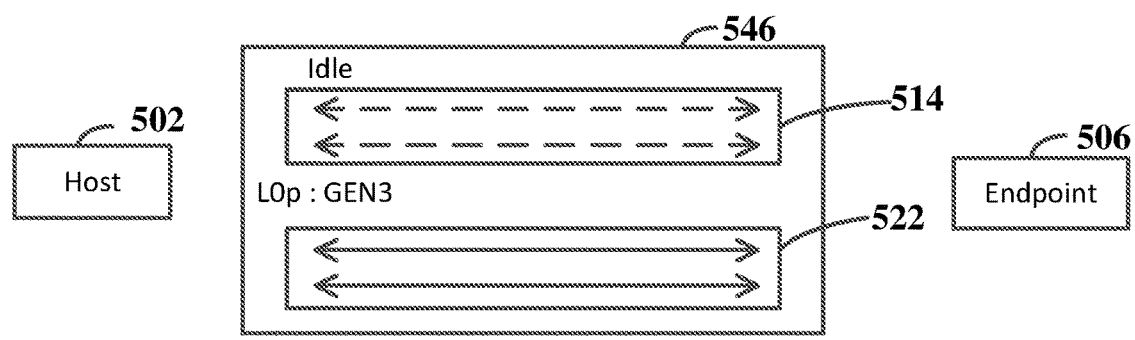
FIG. 5D is a diagram of a multiple lane data link with data traffic transferred to a second set of lanes according to aspects of the present disclosure.

FIG. 5D shows a multiple lane data link 546 between the host 502 and the EP 506 after data traffic is transferred to the second set of lanes 522. The configuration of the second set of lanes has been changed to the new data rate. The data traffic is being transmitted on the second set of lanes 522 of the data link. The second set of lanes 522 of the data link 546 is carrying the data traffic at the requested data rate, GEN3, instead of the first set of lanes 514. The first set of lanes 514 of the data link 546 is not needed to support the x2 link width and so it is changed to the electrical idle state.

The x2 link width is using lane 2 and lane 3 and not lane 0 and lane 1. In some aspects, lane reversal may be enabled to support using the highest numbered lanes (e.g., lane 3 and lane 2) instead of the lowest numbered lanes (e.g., lane 0 and lane 1). During the recovery and configuration as shown in FIG. 5B there is no interruption in the data traffic on the first set of lanes 511 while the second set of lanes 520 is training to the requested data rate. After the link 546 has been reconfigured, the first set of lanes is no longer needed to support the requested data rate and link width. The first set of lanes 514 is therefore transitioned to an idle state. The particular data rates, GEN2 and GEN3, are provided as examples. A similar process may be performed for any data rate change and also to up-size or down-size the link width.

As shown in FIG. 5B data rates may be configured differently for different lanes. The first set of lanes has a different GEN speed than the second set of lanes. This allows one or more lanes to be retrained as shown in FIG. 5B with a new GEN speed configuration without disturbing the other active lanes that are operating at a different GEN speed. The second set of lanes 520 is retrained to the GEN3 speed without disturbing the first set of lanes 511 operating at the GEN2 speed. The second set of lanes 512, in an electrical idle, is used to satisfy the GEN speed change requirements. During the data rate switch from GEN2 speed to GEN3 speed, the same number of electrical idle lanes were brought up out of idle to recovery and configuration into the new data rate, the GEN3 speed.

Once the new set of lanes, the second set of lanes 522, shown in FIG. 5C is also brought up to the requested data rate, the GEN3 speed, the data traffic of the PCIe link may transfer to the new set of lanes that are operating at the new data rate. This may be done by sending an interrupt, e.g., from the RC controller, to the host 502 and to the EP 506 to stop using the first set of lanes, working at the old data rate, and start using the second set of lanes, working at the new data rate. The first set of lanes 514 may be put directly into electrical idle, as shown in FIG. 5D, or retrained to the new data rate and then put into electrical idle. If there are other lanes in electrical idle that are not being used in this process then those lanes may also be trained to the new data rate and then put into electrical idle. The retraining makes the idle lanes available for a link width up-sizing request at the new data rate.

The host 502 and the EP 506 both include system memory and the system memories include control registers, e.g., a link width control register, a first lane control register, and an enable control register. The control registers may use an enable indicator to enable or disable the data rate switch, as shown in FIG. 5B, in which idle lanes are activated and trained to the new speed. The default approach, as shown in FIG. 5C, is for the active lanes always to start with lane 0. With lane reversal, the active lanes always start with the highest numbered lane, e.g., lane 1, lane 3, lane 7, lane 15, or lane 31. An indicator in a link width control register then determines how many additional lanes are active. In the example of FIG. 5C, the link width control register indicates a width of 2 without lane reversal. In the example of FIG. 5D, the active lanes may be indicated with lane reversal and a link width of 2.

Figure 6A:
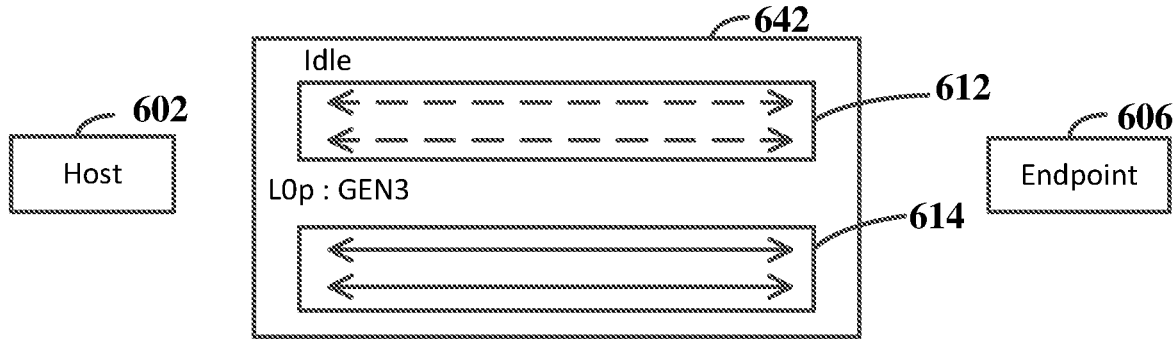
FIG. 6A is a diagram of a multiple lane data link operating in lane reversal according to aspects of the present disclosure.

FIG. 6A shows a multiple lane data link 642 between a host 602 and an EP 606 with a first set of lanes 612 in an idle state and a second set of lanes 614 in an active state. The data link 642 is in a similar configuration as that of FIG. 5D. The second set of lanes 614 of the data link 642 is transmitting the data traffic at a configured data rate, e.g., GEN3. The first set of lanes 612 is in an electrical idle state. This provides an x2 link width at GEN3 speed with lane reversal.

Figure 6B:
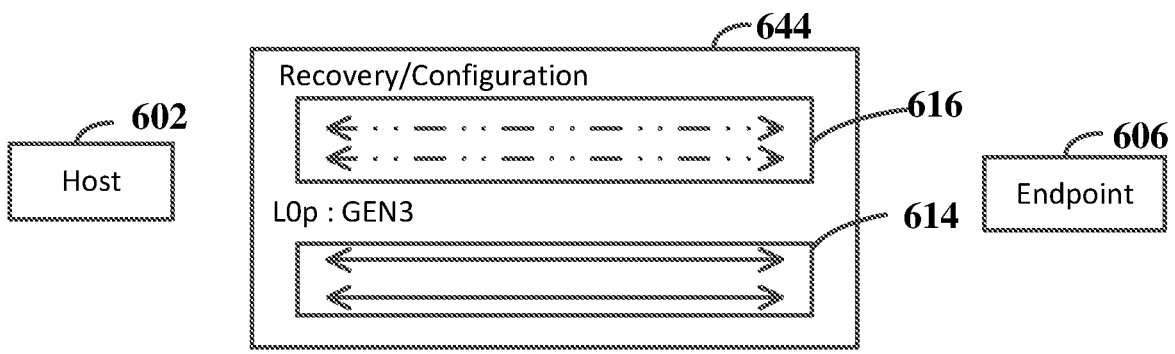
FIG. 6B is a diagram of a multiple lane data link with a first set of lanes in recovery and configuration according to aspects of the present disclosure.

FIG. 6B shows a multiple lane data link 644 between the host 602 and the EP 606 during a recovery and reconfiguration. In FIG. 6B, a request to up-size the link width has been received, e.g., from x2 to x4 at the requested higher data rate, GEN3. In certain aspects, the width of the link 644 is scalable by controlling the number of lanes that are active. Either the host 602 or the EP 606 may initiate a particular link width or a change in the link width to determine the number of traffic lanes that are powered to transmit and receive data through the link 644. In the case of high transmit or receive traffic, all of the traffic lanes are activated, for an x4 link. If both transmit and receive traffic are low or if there is traffic inactivity, then one or more duplex traffic lanes may be put in a low power state. The x1 configuration is operated using only lane 0. The x2 configuration is operated using lane 0 and lane 1, or as shown, using lane 2 and lane 3 with lane reversal. The x4 configuration uses all four lanes.

The data link 644 is operating at x2 using only the second set of data lanes 614. The second set of data lanes 614 continue to transmit the data traffic between the host 602 and the EP 604 at the requested data rate as in FIG. 6A. In response to the link width request, the first set of lanes 616 is changed from the idle state to the configuration and recovery state. In this example, the first set of lanes is being trained to the requested data rate, GEN3.

Figure 6C:
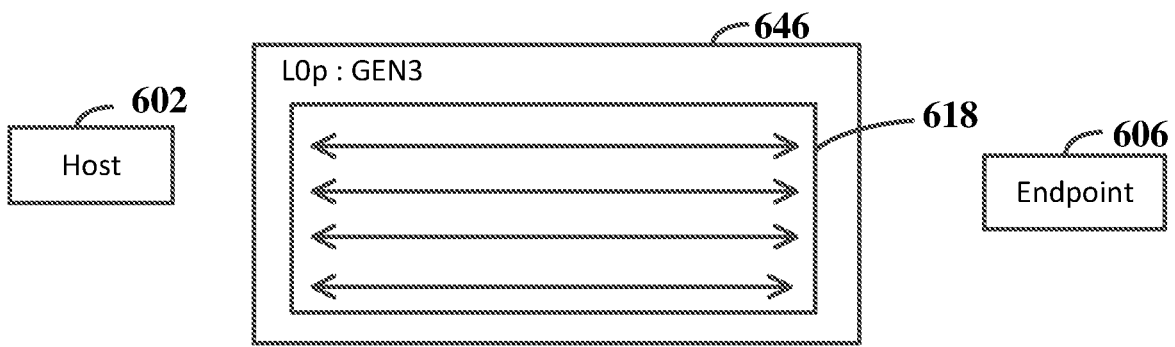
FIG. 6C is a diagram of a multiple lane data link with an up-sized data link width according to aspects of the present disclosure.

FIG. 6C shows a multiple lane data link 646 between the host 602 and the EP 606 after the link width is up-sized to x4. In FIG. 6C, the first set of lanes 616 is recovered and configured to be able to operate at the requested data rate, GEN3, together with the second set of lanes to form a single set of lanes 618 all in an active state operating at the requested data rate. The prior x2 data link of FIG. 6A has been converted to an x4 link using the two idle lanes.

In some aspects, a transition to a new data rate and to an up-sized data link width may be made at the same time. As an example, a data link 544 as shown in FIG. 5B has a first active set of lanes 511 at GEN2 and a second active set of lanes 522 at GEN3. The data link may then transition directly from the configuration of FIG. 5B to the configuration of FIG. 6B by transitioning the first set of lanes 616 to recovery and configuration instead of to an idle state. The first set of lanes 616 may then be configured at the new data rate, GEN3, and used to up-size the link width as shown in FIG. 6C.

Figure 7A:
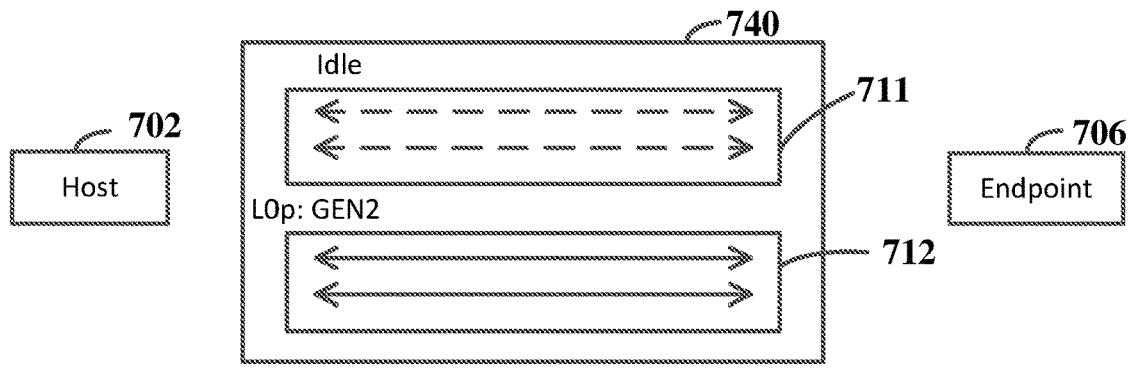
FIG. 7A is a diagram of a multiple lane data link operating in lane reversal according to aspects of the present disclosure.

FIG. 7A is a diagram of a multiple lane data link 740 e.g., a PCIe link of duplex traffic lanes between a host 702 and an EP 706. The duplex traffic lanes are in the same structure and operating conditions as in the example shown in FIG. 5D. The first set of lanes 711, lane 0 and lane 1, is in an idle state. The second set of lanes 712, lane 2 and lane 3, is in an active state. Data traffic may be transmitted in one or both directions with a particular data rate or speed configuration, e.g., GEN2 speed. The data link 740 is operating in lane reversal. This configuration may have occurred as a result of the sequence of FIGS. 5A to 5D or for any other suitable reason. While four lanes are shown, there may be more or fewer lanes to suit particular implementations. From this configuration, the data link may transition back to normal lane ordering with or without a change of speed.

Figure 7B:
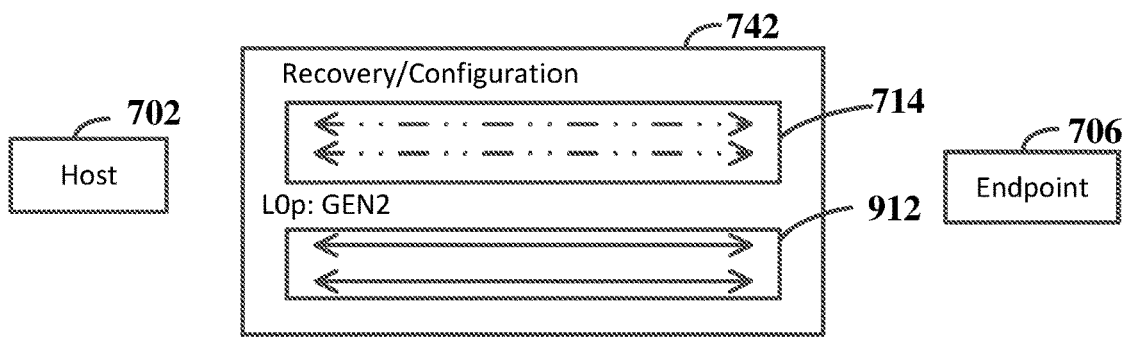
FIG. 7B is a diagram of a multiple lane data link with a first set of lanes in recovery and configuration according to aspects of the present disclosure.

FIG. 7B shows a multiple lane data link 742 between the host 702 and the EP 706 during a recovery and configuration of the first set of lanes 714. In one aspect, when a controller at the host 702 or EP 704 receives a request to change the data rate of the data link 742 to a requested data rate, e.g., from GEN2 to GEN3, the state of the first set of lanes 714 is changed to an active state and taken to the recovery state and then the configuration state. This may also occur in response to a request to reverse the lane reversal. The second set of lanes 712 stays in an active state and transmits the data traffic through the data link 742 between the host 702 and the EP 704. While the first set of lanes 714 is undergoing recovery and configuration, the multiple lane data link 742 between the host 702 and the EP 704 continues to transmit data traffic at the original data rate on the original second set of lanes 712, lane 0 and lane 1.

Figure 7C:
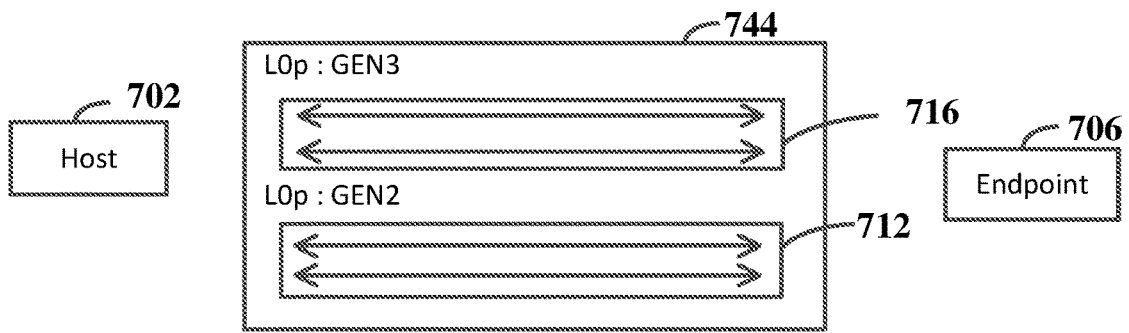
FIG. 7C is a diagram of a multiple lane data link after a configuration state speed change according to aspects of the present disclosure.

FIG. 7C shows a multiple lane data link 744 between the host 702 and the EP 706 after the configuration state speed change of the first set of lanes 716. The second set of lanes 712 is still in the same active state, e.g., the L0 state. Data may be transmitted in both directions at the original speed, e.g., GEN2, as in FIGS. 7A and 7B. The first set of lanes 716, lane 0 and lane 1 have been reconfigured into an active state at the new requested data rate, e.g., GEN3 speed. The data traffic is transferred from the second set of lanes 712 to the first set of lanes 716 after the training in FIG. 7B. The data traffic is then transmitted on the first set of lanes.

Figure 7D:
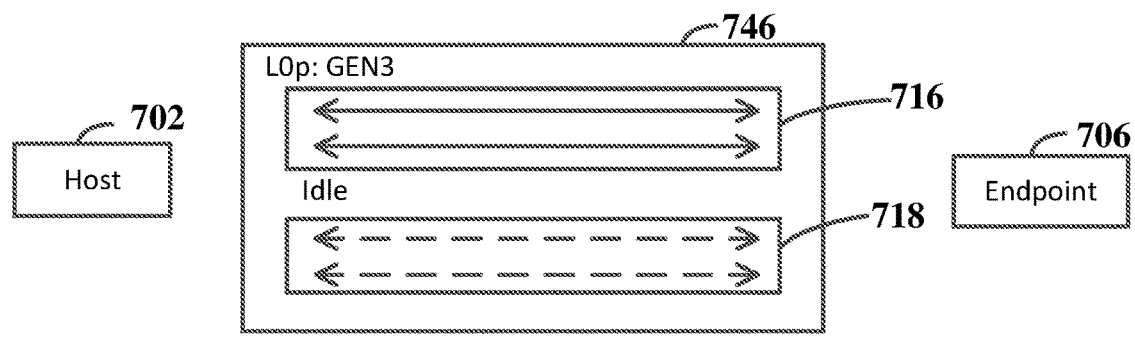
FIG. 7D is a diagram of a multiple lane data link with data traffic transferred to a first set of lanes according to aspects of the present disclosure.

FIG. 7D shows a multiple lane data link 746 between the host 702 and the EP 706 after transferring the data traffic to the first set of lanes 716 and changing the second set of lanes 718 to an idle state. The first set of lanes 716 of the data link 746 is now carrying the data traffic at the requested data rate, GEN3, instead of the second set of lanes 714. The second set of lanes 718 of the data link 746 is not needed to support the x2 link width. Therefore, the second set of lanes 718 may be changed to the electrical idle state. In some aspects, the second set of lanes is trained and configured to the new data rate before changing the state to an idle state. In the example shown in FIG. 7D, the data rate of the data link has been changed and lane reversal is no longer required. The x2 link is carried on the first set of lanes, lane 0 and lane 1. In some examples, lane reversal may be disabled. In this example as in the others, the data rate has been increased from GEN2 to GEN3. However, the same approach may be used to decrease the data rate from GEN3 to GEN2. The data rates may also be changed from and to other rates, including rates that are not adjacent, e.g., from GEN5 to GEN2. This approach may be used for any data rate change and also to up-size or down-size the link width.

Figure 8A:
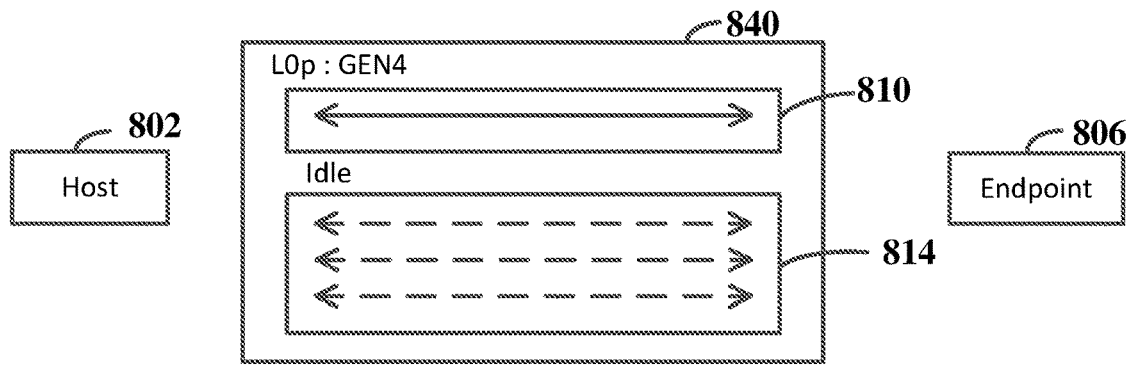
FIG. 8A is a diagram of a multiple lane data link operating in x1 width according to aspects of the present disclosure.

FIG. 8A shows a multiple lane data link 840 e.g., a PCIe link of duplex traffic lanes between a host 802 and an EP 806. The duplex traffic lanes are in the same structure and operating conditions as in the example shown in FIG. 5A. The first set of lanes 810, has a single lane, lane 0 and is in an active state, e.g., an L0 state as an x1 link and transmitting data in one or both directions with a particular data rate or speed configuration, e.g., GEN4 speed. The second set of lanes 814, lane 1, lane 2 and lane 3, is in an idle state, and not transmitting any traffic. While four lanes are shown, there may be more or fewer lanes to suit particular implementations.

Figure 8B:
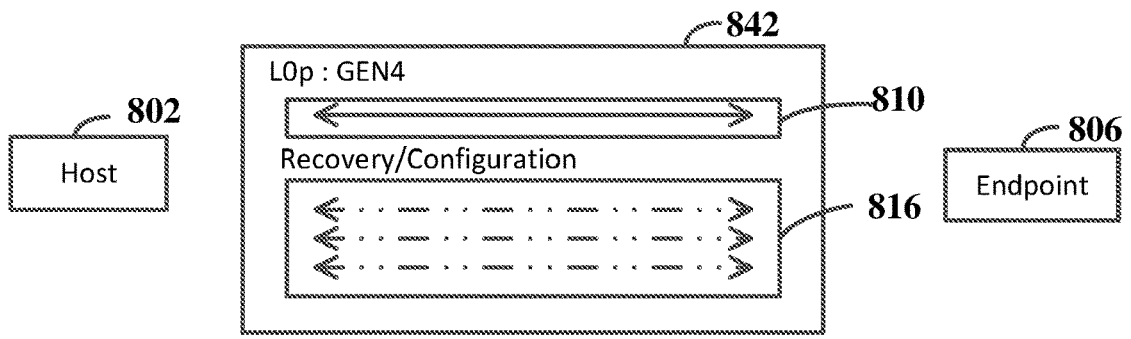
FIG. 8B is a diagram of a multiple lane data link with a second set of lanes in recovery and configuration according to aspects of the present disclosure.

FIG. 8B shows a multiple lane data link 842 between the host 802 and the EP 806 training to a new data rate. In one aspect, a controller at the host 802 or EP 804 receives a request to change the data rate of the data link 842, from GEN4 to GEN3 and to change the link width from x1 to x2. This is an example and other combinations are possible. The data link 842 is changed by changing the idle state lanes of the second set of lanes to an active state through a recovery state and a configuration state. The first set of lanes 810 continue to transmit data traffic as before. This is changing the second set of lanes from the idle state to an active state and training the second set of lanes to the requested data rate. While the second set of lanes 820 is undergoing recovery and configuration, the data link 842 continues to transmit data traffic at the original data rate on the original first set of lanes 811 that includes lane 0 only.

Figure 8C:
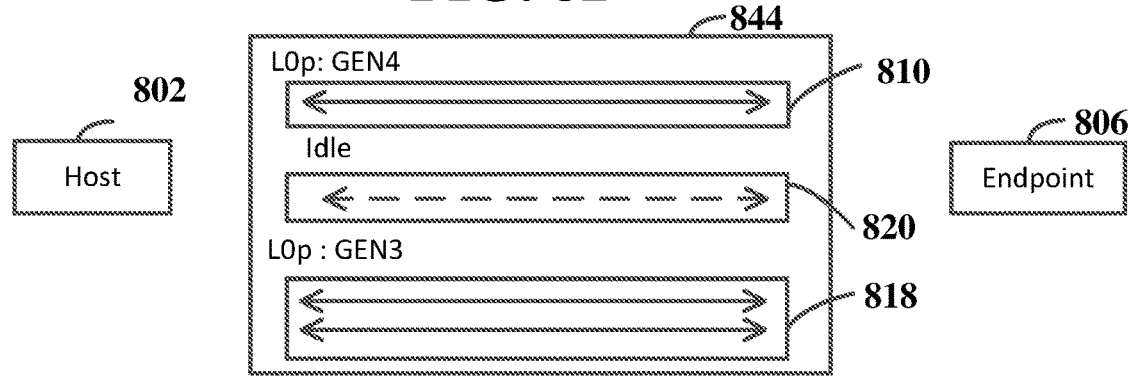
FIG. 8C is a diagram of a multiple lane data link after a configuration state speed change according to aspects of the present disclosure.

FIG. 8C shows a multiple lane data link 844 after the configuration state speed change of the second set of lanes 818. The first set of lanes 811 is still in the same active state, e.g., the L0 state. Data may be transmitted in both directions at the original speed, e.g., GEN4, as in FIGS. 8A and 8B. The second set of lanes 816 of FIG. 8B is configured into two separate sets. Lane 2 and lane 3 have been reconfigured into a new second set of lanes 818 and changed to an active state at the new requested data rate, e.g., GEN3 speed. Traffic is still being carried on the first set of lanes 811 at the original speed. Lane 1 is the only lane in a third set of lanes 820 and is changed to an idle state. The data traffic is transferred from the first set of lanes 810 to the second set of lanes 818 after the training in FIG. 8B.

Figure 8D:
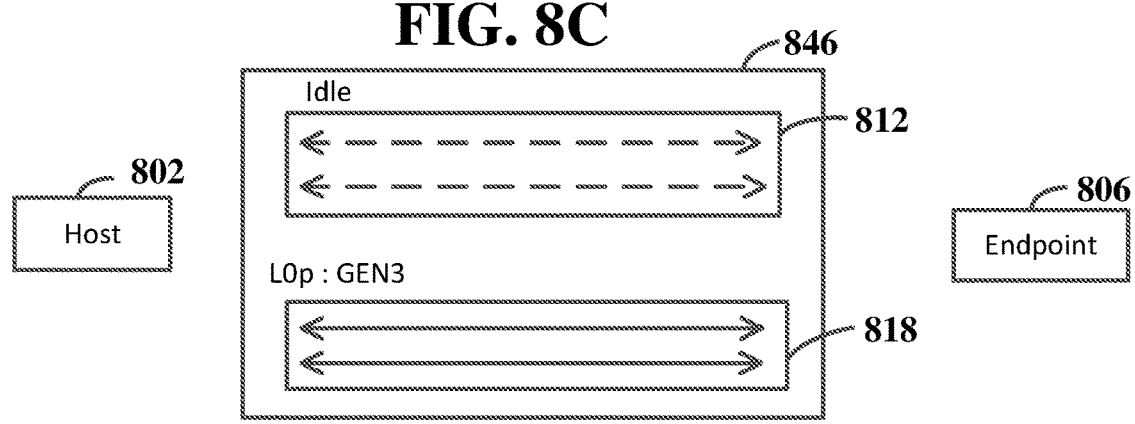
FIG. 8D is a diagram of a multiple lane data link with data traffic transferred to a first set of lanes according to aspects of the present disclosure.

FIG. 8D shows a multiple lane data link 846 between the host 802 and the EP 806 after data traffic is transferred to the second set of lanes 818. The configuration of the second set of lanes has been changed to the new data rate. The data traffic is being transmitted on the second set of lanes 822 of the data link. The first set of lanes 812 of the data link 846 is not needed to support the x2 link width and so it is changed to the electrical idle state. The first set of lanes 810 and the third set of lanes 820 are combined to form the new first set of lanes 812 and both are changed to an idle state. The request for a new data rate and a new link width is done.

The x2 link width is using lane 2 and lane 3 and not lane 0 nor lane 1. In some aspects, lane reversal may be enabled to support using lane 3 and lane 2 instead of lane 0 and lane 0. Because active lanes are to be adjacent and include either the first lane, lane 0, or with lane reversal the last lane, lane 3, in an x4 link, lane 1 is not used in the new configuration. Similar principles may be applied to other link widths and other transitions. The first set of lanes 812 may be trained to the new data rate directly or remain in the idle state.

Figure 9:
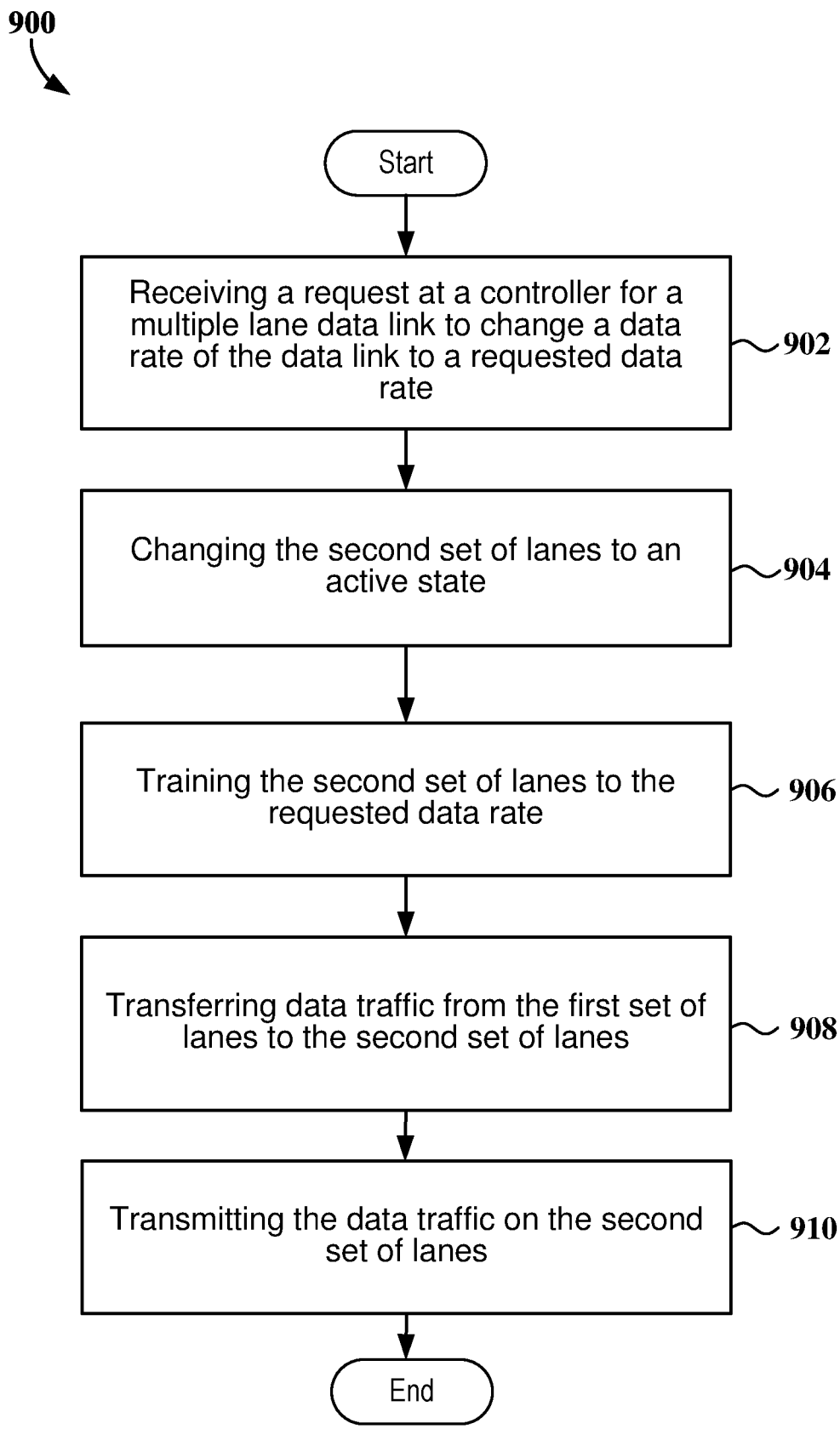
FIG. 9 is a flow diagram of an exemplary method for bandwidth-based power management according to aspects of the present disclosure.

FIG. 9 illustrates a flow diagram of a method 900 for reducing latency for link speed switching in multiple lane data links, e.g., a PCIe link, according to aspects of the present disclosure. In certain aspects, the method 900 involves switching the speed of idle traffic lanes of a link while the active lanes continue to transmit data traffic. When the formerly idle traffic lanes are configured to the new speed, then the data traffic is transferred to the configured lanes. This allows the data traffic to continue without interruption during the speed switch. Some modifications may be made to control registers to indicate the change in operation. A method of switching the speed of traffic lanes in a PCIe link may be performed by PCIe controllers including the RC controller 218, also referred to as the host controller, and the EP controller 262. There will be a negotiation to establish capabilities and bandwidth requirements. Once the negotiation is finished, then the RC controller will trigger the method 900 to bring up a second set of lanes with the requested gen speed. Once the lanes are up, the RC controller will fire the interrupt to shift ongoing data transfers from the first set of active lanes to the second set of newly trained lanes.

The method 900 includes receiving a request at a controller for a multiple lane data link to change a data rate of the data link to a requested data rate at block 902. The data link has a first set of lanes in an active state and a second set of lanes in an idle state. The first set of lanes may have a lower or higher lane number than the second set of lanes. As described, the link is a PCIe link, however, the method may be adapted to suit other links with multiple lanes.

The method 900 includes a process at block 904 of changing the second set of lanes to an active state. When L0p is enabled, a set of lanes may be in active state L0p and all other lanes may be in electrical idle. The method 900 includes a process at block 906 of training the second set of lanes to the requested data rate. The training may be conducted through a recovery state and a configuration state or using a different process to suit the particular data link. In some aspects, the data traffic is being transmitted on the first set of lanes while the second set of lanes is training.

The method 900 includes a process at block 908 of transferring data traffic from the first set of lanes to the second set of lanes after the training An interrupt may be sent to the host controller and to the end point controller to transfer the data traffic from the first set of lanes to the second set of lanes. To facilitate the transfer, a controller may write an indicator to a control register to identify the second set of lanes. For example, a start lane number for the second set of lanes, which is the active set of lanes, may be written to a control register. In addition, a controller may write an indicator of the width of the data link to the control register. A controller may also write a lane reversal indicator to a control register to indicate whether the first lane is the highest numbered lane or the lowest numbered lane in the link width. The method includes a process at block 910 of transmitting the data traffic on the second set of lanes.

The first set of lanes is no longer carrying traffic after the transferring. In some examples, the method 900 may optionally include changing the first set of lanes to an idle state or training the first set of lanes to the requested data rate and then changing the first set of lanes to an idle state. In some examples, the method 900 may also include training the first set of lanes to the requested data rate and then up-sizing or down-sizing the link width using the first set of lanes.

Figure 10:
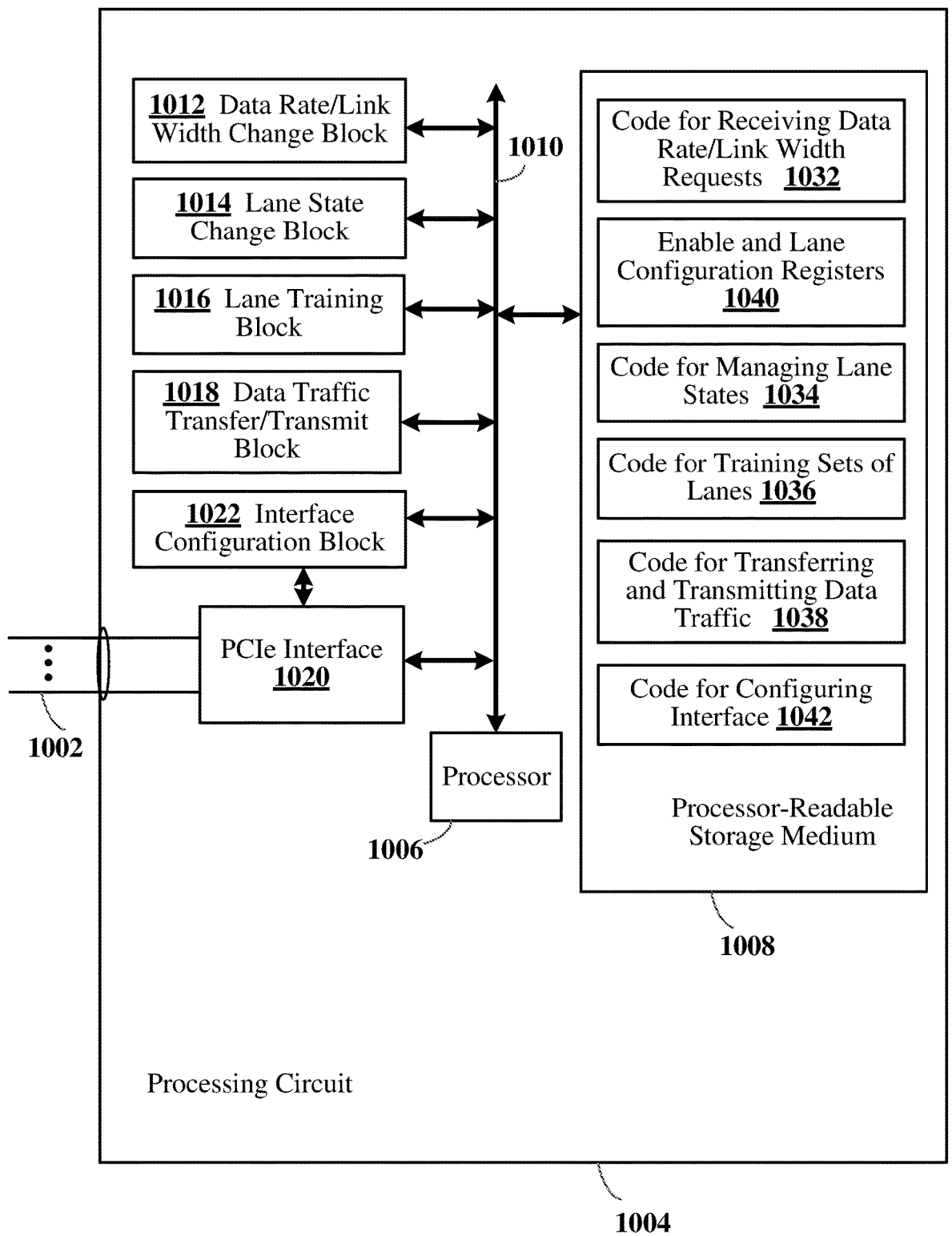
FIG. 10 is a block diagram of a PCIe link interface processing circuit according to aspects of the present disclosure.

FIG. 10 is a block diagram of a link interface processing circuit. The processing circuit 1004 is an apparatus that may be a part of a host or an endpoint. It is coupled to a link 1002, e.g., a PCIe link, with multiple duplex lanes. The link 1002 is coupled at an opposite end to another PCIe device e.g., an endpoint or a host. Data and control information communicated as packets through the link 1002 are coupled to a PCIe interface 1020 which provides a PHY level interface to the link and converts baseband signals to packets. The data and control packets are sent through the interface 1020 through a bus 1010 to other components of the processing circuit 1004.

The processing circuit 1004 includes a memory 1008. In addition, the processing circuit 1004 includes a Data Rate/Link Width Change Block 1012 that is coupled to the bus 1010 to receive and send requests to change the data rate and/or the link width of the link 1002. The Data Rate/Link Width Change Block 1012 may access a computer-readable storage medium 1008 to access code for receiving data rate/link width requests 1032. In aspects, the storage medium 1008 is a non-transitory computer-readable storage medium. The non-transitory computer-readable storage medium 1008 has instructions stored therein for causing the processor 1006 of the interconnect link to perform operations as shown and described in the context of FIGS. 9 and 10. The Data Rate/Link Width Change Block 1012 may also access Enable and Lane Configuration Registers 1040 in the storage medium 1008 that contain enable bits and configuration bits, e.g., control registers in the system memory of the processing circuit 1004.

In addition, within the processing circuit 1004, a Lane State Change Block 1014 may be configured to cause the state of the lanes in the link 1002 to change from active to inactive. The Lane State Change Block may operate, for example, using the Active State Power Management (ASPM) protocol of the PCIe system or using another protocol or approach. The Lane State Change Block 1014 has access through the bus 1010 to code for managing lane states 1034 and to the Enable and Lane Configuration Registers 1040 as well as to other control registers of the processing circuit. These registers may be used to store changes in the states of the lanes for use by other blocks.

A Lane Training Block 1016 within the processing circuit 1004 has access to the bus 1010 to train sets of lanes to higher or lower data rates, e.g., training a first set of lanes or a second set of lanes to a requested data rate. The Lane Training Block 1016 has access to code for training sets of lanes 1036 in the storage medium 1008 and also to the Enable and Lane Configuration Registers 1040 to store results.

A Data Traffic Transfer/Transmit Block 1018 within the processing circuit 1004 has access to the bus 1010 to transfer data traffic from a first set of lanes to a second set of lanes after the training and to transmit the data traffic on the second set of lanes. The Data Traffic Transfer/Transmit Block has access to code for transferring and transmitting data traffic 1038 in the storage medium 1008 and also to the Enable and Lane Configuration Registers 1040 to determine active lanes. Each of the aforementioned blocks may be coupled to the bus 1010 to enable the blocks to communicate with each other, with the storage medium 1008 and to a processor 1006. The processor 1006 controls the operation of the other blocks and instigates instances of each block as appropriate to operation of the processing circuit 1004.

An Interface Configuration Block 1022 has access to code for configuring the PCIe interface 1042. On executing this code, the Interface Configuration Block 1022 reads and writes values from a variety of configuration registers. These registers include the Enable and Lane Configuration Registers 1040 that may be a part of control, status, and capabilities registers. These registers may be accessed and read at the start of Link Initialization and then updated with state changes and activity changes. The registers may also be modified in response to power management and bandwidth negotiations or to change the status of one or more lanes of the link 1002.

The following provides an overview of examples of the present disclosure.

Example 1: An apparatus comprising: an interface circuit configured to provide an interface with a multiple lane data link, the data link having a first set of lanes in an active state and a second set of lanes in an idle state; and a controller configured to: receive a request at the controller to change a data rate of the data link to a requested data rate; change the second set of lanes from an idle state to an active state; train the second set of lanes to the requested data rate; transfer data traffic from the first set of lanes to the second set of lanes after the training; and transmit the data traffic on the second set of lanes.

Example 2: The apparatus of example 1, wherein the controller is further configured to change the first set of lanes to an idle state.

Example 3: The apparatus of example 1 or 2, further comprising a link width control register, the controller being configured to write an indicator of a width of the data link including the second set of lanes to the link width control register.

Example 4: The apparatus of example 3, further comprising a first lane control register, the controller being configured to write an indicator of a first lane of the second set of lanes as an active set of lanes to first lane control register.

Example 5: The apparatus of any one or more of examples 1-4, further comprising an enable control register, the controller being configured to write an enable indicator into the enable control register to indicate that data traffic can be transferred from the first set of lanes to the second set of lanes.

Example 6: A method comprising: receiving a request at a controller for a multiple lane data link to change a data rate of the data link to a requested data rate, the data link having a first set of lanes in an active state and a second set of lanes in an idle state; changing the second set of lanes to an active state; training the second set of lanes to the requested data rate; transferring data traffic from the first set of lanes to the second set of lanes after the training; and transmitting the data traffic on the second set of lanes.

Example 7: The method of example 6, further comprising changing the first set of lanes to an idle state after transferring the data traffic.

Example 8: The method of example 6 or 7, further comprising training the first set of lanes to the requested data rate during transmitting the data traffic on the second set of lanes.

Example 9: The method of any one or more of examples 6-8, further comprising up-sizing the data link to include the first set of lanes.

Example 10: The method of any one or more of examples 6-9, further comprising writing an indicator of a width of the data link including the second set of lanes to a control register of the data link.

Example 11: The method of example 10, wherein writing an indicator of the width further comprises writing an indicator of a first lane of the second set of lanes as an active set of lanes to a control register of the data link.

Example 12: The method of any one or more of examples 6-11, further comprising writing an enable indicator into a control register of the data link to indicate that data traffic can be transferred from the first set of lanes to the second set of lanes.

Example 13: The method of any one or more of examples 6-12, wherein training the second set of lanes comprises training the second set of lanes during transmitting the data traffic on the first set of lanes.

Example 14: The method of any one or more of examples 6-13, wherein transferring the data traffic comprises, after training the second set of lanes, sending an interrupt to a host controller and to an end point controller to transfer the data traffic from the first set of lanes to the second set of lanes.

Example 15: The method of any one or more of examples 6-14, wherein the data link is a peripheral component interconnect express (PCIe) link and wherein the training comprises a PCIe recovery state and a PCIe configuration state.

Example 16: The method of example 15, wherein the first set of lanes is in a PCIe L0p state in the active state.

Example 17: The method of example 15 or 16, wherein the second set of lanes is in electrical idle state.

Example 18: The method of any one or more of examples 15-17, wherein changing the second set of lanes to the active state comprises changing the second set of lanes to a PCIe L0p state.

Example 19: A non-transitory computer-readable medium having instructions stored therein for causing a processor of an interconnect link to perform operations comprising: receiving a request at a controller for a multiple lane data link to change a data rate of the data link to a requested data rate, the data link having a first set of lanes in an active state and a second set of lanes in an idle state; changing the second set of lanes to an active state; training the second set of lanes to the requested data rate; transferring data traffic from the first set of lanes to the second set of lanes after the training; and transmitting the data traffic on the second set of lanes.

Example 20: The non-transitory computer-readable medium of example 19, wherein training the second set of lanes comprises training the second set of lanes during transmitting the data traffic on the first set of lanes.

Example 21: The non-transitory computer-readable medium of example 19 or 20, wherein the instructions for transferring the data traffic comprise instruction for sending an interrupt to a host controller and to an end point controller to transfer the data traffic from the first set of lanes to the second set of lanes after training the second set of lanes.

Example 22: An apparatus comprising: means for providing an interface with a multiple lane data link means for receiving a request to change a data rate of the data link to a requested data rate, the data link having a first set of lanes in an active state and a second set of lanes in an idle state; means for changing the second set of lanes to an active state; means for training the second set of lanes to the requested data rate; means for transferring data traffic from the first set of lanes to the second set of lanes after the training; and means for transmitting the data traffic on the second set of lanes. [This section will be completed with the final draft.]

It is to be appreciated that the present disclosure is not limited to the exemplary terms used above to describe aspects of the present disclosure. E.g., bandwidth may also be referred to as throughput, data rate or another term.

Although aspects of the present disclosure are discussed above using the example of the PCIe standard, it is to be appreciated that present disclosure is not limited to this example, and may be used with other standards.

The host clients 214, the host controller 212, the device controller 252 and the device clients 254 discussed above may each be implemented with a controller or processor configured to perform the functions described herein by executing software including code for performing the functions. The software may be stored on a non-transitory computer-readable storage medium, e.g., a RAM, a ROM, an EEPROM, an optical disk, and/or a magnetic disk, shows as host system memory 240, endpoint system memory 274, or as another memory.

Any reference to an element herein using a designation e.g., "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect electrical or other communicative coupling between two structures. Also, the term "approximately" means within ten percent of the stated value.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
an interface circuit configured to provide an interface with a multiple lane data link, the data link having a first set of lanes in an active state and a second set of lanes in an idle state; and
a controller configured to:
receive a request at the controller to change a data rate of the data link to a requested data rate;
change the second set of lanes from an idle state to an active state;
train the second set of lanes in the active state to the requested data rate with no interruption to data traffic on the first set of lanes;
write a lane reversal indicator to a first control register after the training;
write an enable indicator to a second control register for the second set of lanes;
transfer data traffic from the first set of lanes to the second set of lanes after the training and after writing the enable indicator; and
transmit the data traffic on the second set of lanes at the requested data rate.

2. The apparatus of claim 1, wherein the controller is further configured to change the first set of lanes to an idle state after transferring the data traffic.

3. The apparatus of claim 1, further comprising a link width control register, the controller being configured to write an indicator of a width of the data link including the second set of lanes to the link width control register.

4. The apparatus of claim 3, wherein the first control register comprises a first lane control register, the controller being configured to write the lane traversal indicator by writing an indicator of a first lane of the second set of lanes as an active set of lanes to the first lane control register.

5. The apparatus of claim 1, wherein the second control register comprises an enable control register, the controller being configured to write the enable indicator into the enable control register to indicate that data traffic can be transferred from the first set of lanes to the second set of lanes.

6. A method comprising:
receiving a request at a controller for a multiple lane data link to change a data rate of the data link to a requested data rate, the data link having a first set of lanes in an active state and a second set of lanes in an idle state;
changing the second set of lanes to an active state;
training the second set of lanes in the active state to the requested data rate with no interruption to data traffic on the first set of lanes;
writing a lane reversal indicator to a first control register after the training;
writing an enable indicator to a second control register for the second set of lanes;
transferring data traffic from the first set of lanes to the second set of lanes after the training and after writing the enable indicator; and
transmitting the data traffic on the second set of lanes.

7. The method of claim 6, further comprising changing the first set of lanes to an idle state after transferring the data traffic.

8. The method of claim 6, further comprising training the first set of lanes to the requested data rate during transmitting the data traffic on the second set of lanes.

9. The method of claim 6, further comprising up-sizing the data link to include the first set of lanes.

10. The method of claim 6, further comprising writing an indicator of a width of the data link including the second set of lanes to a link width control register of the data link.

11. The method of claim 10, wherein the second set of lanes has 1, 2, 4, 8, 12, 16, or 32 lanes and wherein writing an indicator of the width further comprises writing an indicator of 1, 2, 4, 8, 12, 16, or 32 lanes.

12. The method of claim 6, wherein the second control register comprises an enable control register and wherein writing the enable indicator comprises writing the enable indicator into the enable control register of the data link to indicate that data traffic can be transferred from the first set of lanes to the second set of lanes.

13. The method of claim 6, wherein training the second set of lanes comprises training the second set of lanes during transmitting the data traffic on the first set of lanes.

14. The method of claim 6, wherein transferring the data traffic comprises, after training the second set of lanes, sending an interrupt to a host controller and to an end point controller to transfer the data traffic from the first set of lanes to the second set of lanes.

15. The method of claim 6, wherein the data link is a peripheral component interconnect express (PCIe) link and wherein the training comprises a PCIe recovery state and a PCIe configuration state.

16. The method of claim 15, wherein the first set of lanes is in a PCIe L0p state in the active state.

17. The method of claim 15, wherein the second set of lanes is in electrical idle state.

18. The method of claim 15, wherein changing the second set of lanes to the active state comprises changing the second set of lanes to a PCIe L0p state.

19. An apparatus comprising:
means for providing an interface with a multiple lane data link:
means for receiving a request to change a data rate of the data link to a requested data rate, the data link having a first set of lanes in an active state and a second set of lanes in an idle state;
means for changing the second set of lanes to an active state;
means for training the second set of lanes in the active state to the requested data rate with no interruption to data traffic on the first set of lanes;
means for writing a lane reversal indicator to a first control register after the training;
means for writing an enable indicator to a second control register for the second set of lanes;
means for transferring data traffic from the first set of lanes to the second set of lanes after the training and after writing the enable indicator; and
means for transmitting the data traffic on the second set of lanes.

20. The apparatus of claim 19, wherein the means for training the second set of lanes comprises means for training the second set of lanes during transmitting the data traffic on the first set of lanes.

* * * * *

UNITED STATES PATENT AND TRADEMARK OFFICE
CERTIFICATE OF CORRECTION

PATENT NO. : 12,019,577 B2  
APPLICATION NO. : 17/960050  
DATED : June 25, 2024  
INVENTOR(S) : Prakhar Srivastava et al.

Page 1 of 1

It is certified that error appears in the above-identified patent and that said Letters Patent is hereby corrected as shown below:

In the Specification

Column 16, Lines 28-29: the phrase "instead of lane 0 and lane 0." is replaced with "instead of lane 0 and lane 1."

Signed and Sealed this  
Thirteenth Day of May, 2025

Coke Morgan Stewart  
*Acting Director of the United States Patent and Trademark Office*